United States Patent [19]

Migdal et al.

[11] Patent Number: 6,064,771
[45] Date of Patent: May 16, 2000

[54] SYSTEM AND METHOD FOR ASYNCHRONOUS, ADAPTIVE MOVING PICTURE COMPRESSION, AND DECOMPRESSION

[75] Inventors: Alexander A. Migdal; Blaise Aguera-Arcas, both of Princeton, N.J.

[73] Assignee: Real-Time Geometry Corp., Short Hills, N.J.

[21] Appl. No.: 08/880,806

[22] Filed: Jun. 23, 1997

[51] Int. Cl.$^7$ ........................................................ G06K 9/36
[52] U.S. Cl. ............................................................ 382/232
[58] Field of Search .................................... 382/232, 236, 382/238, 240, 248, 250; 358/432, 433; 348/384, 394, 395, 400–404, 407–416, 420, 421, 425, 430, 431, 699; 341/50, 51; 704/500, 503; 345/202, 203

[56] References Cited

U.S. PATENT DOCUMENTS

| | | | |
|---|---|---|---|
| 5,122,873 | 6/1992 | Golin | 382/240 |
| 5,379,351 | 1/1995 | Fandrianto et al. | 382/236 |
| 5,455,577 | 10/1995 | Slivka et al. | 341/51 |
| 5,493,514 | 2/1996 | Keith et al. | 364/514 R |
| 5,544,286 | 8/1996 | Laney | 395/114 |
| 5,572,206 | 11/1996 | Miller et al. | 341/51 |
| 5,592,228 | 1/1997 | Dachiku et al. | 382/241 |
| 5,608,396 | 3/1997 | Cheng et al. | 341/50 |
| 5,612,900 | 3/1997 | Azadegan et al. | 364/514 R |

*Primary Examiner*—Jose L. Couso
*Attorney, Agent, or Firm*—Kenyon & Kenyon

[57] ABSTRACT

System and method for asynchronous transmission of video images such as from a sending to a receiving terminal or from a sending processor to a storage medium like videotape. The system receives moving picture image information such as analog video digitized into 2D bitmap data and employs a modeling system such as a triangulated mesh modeling system to create an initial image consisting of a compact set of N elements (such as the data points of a triangulated mesh) where the number of elements is less than the number of elements necessary to display the image. In the exemplary embodiment the model elements are bitmap pixel assignments, however other elements such as wavelets, or Fourier component elements, or iterated function system (IFS maps) could also be used. As the images of the moving picture change, the sending computer compares data for each new image against the current model elements and will add elements to or remove elements from the model to update the model to make it current with the new image. The sending computer outputs a sequence of commands to replicate the model building and subsequent updating either to a receiving terminal (which displays the moving image in real time) or to a digital or analog storage medium such as a disk or analog tape. This entire video sequence can be compressed into a sequence of add and remove commands. These commands can be output across communication systems or stored for later playback. In creating each add or remove command, the present invention employs an encoding technique which indexes the spatial coordinate data and color pixel assignment data, so that an instruction can be encoded with an index rather than specifying a full longhand command. A decompress function of the present invention is comprised to decode each encoded command and execute the instruction. The modeling system presented is also adaptive to allow greater clarity or resolution in the images transmitted depending on the amount of bandwidth available in the communications or storage system.

14 Claims, 37 Drawing Sheets

Rendering

Mesh

Rendering

Mesh

SYSTEM AND METHOD FOR ASYNCHRONOUS, ADAPTIVE MOVING PICTURE COMPRESSION, AND DECOMPRESSION

CROSS-REFERENCE TO RELATED APPLICATIONS

This application is related to:

Co-pending United States Patent application entitled "System and Method for Computer Modeling of 3D Objects and 2D Images by Mesh Constructions that Incorporate Non-Spatial Data such as Color and Texture" filed on even date herewith (the "Co-Pending Application");

Pending U.S. patent application Ser. No. 08/730,980 entitled, "System and Method for Rapidly Generating an Optimal Mesh Model of a 3D Object or Surface" filed on Oct. 16, 1996; and Pending U.S. patent application Ser. No. 08/730,979 entitled, "System and Method for Computer Modeling of 3D Objects or Surfaces by Mesh Constructions Having Optimal Characteristics and Dynamic Resolution Capabilities" filed on Oct. 16, 1996.

Each application identified above is expressly incorporated by reference herein.

FIELD OF THE INVENTION

The present invention relates to the fields of data compression, transmission, decompression, storage and display for graphic images such as film, video (television) and other moving picture image sequences. In particular, the present invention relates to systems for compressing and decompressing moving picture image sequences by an asynchronous, non frame-based technique. The system for compressing is reductive, i.e. "lossy". The "lossiness" is adjustable and can be tailored to suit factors such as available bandwidth, available storage capacity or the complexity of the image.

BACKGROUND OF THE INVENTION

There has been slow progress in uniting the world of video and film with the power of the computer so that motion picture images—especially live video—can be quickly transmitted to users within a computer network. The advent of the computer network has brought forth tremendous communications capability. Where computers were once seen only as whirring number crunchers and processing machines, they are now also seen as potential vehicles for entertainment, advertising, information access and communication. The potential of video technology holds tantalizing opportunities for businesses, entrepreneurs and the public at large. In the workplace, the ordinary PC computer, a fixture on most office desks, could better maximize business resources with video conferencing and other interactive communications that link one worker or working group to another. Intraoffice computer networks could provide training, demonstrations, reports and news through broadcasts using one centralized computer to send live or taped video to workstations within the office or to linked office and customer sites. Previously, live visual communication links were not thought feasible without specialized video or television equipment.

The establishment of the Internet and its World Wide Web has also created demand for increased use of motion pictures in computer applications. Businesses see the Internet's vast network potential as a boon for interactive communications with the public at large. Entrepreneurs have envisioned and have even attempted live, on-line broadcasts of news, concerts and other events; attempts frustrated by the current limitation of real-time computer video technology. Further, as more people communicate via the World Wide Web, there is a natural incentive to create polished information access sites. Internet users come steeped in the heritage of television, movies and other forms of highly produced motion picture entertainment. These users imagine communicating with that same clarity, expediency and visual power and have come to expect such standards.

The potential for such real-time video communications exists, but until this point there has been great difficulty in transmitting motion picture image sequences, live video (television) and previously recorded film and video through the computer. The limitations on computer speed, memory and disk storage have expanded enough to make the storage of digitized film and video clips possible. However, the inordinate amount of data that must be transmitted to display a digitized moving picture sequence on the computer has been one factor preventing the widespread use of video and film in real time applications—especially those in which speed is imperative, like video conferencing, live news feeds and live entertainment broadcasts. The data problem pertains to the nature of the digital computer and network hardware, the method by which a computer generates images and the processing that is needed to handle the many, many images that make up a motion picture sequence. Since its invention, motion picture technology has followed a process of presenting a rapid sequence of still images to give the impression of motion to the eye. A film is essentially a "flip book" of still camera photographs (i.e. frames) stored on a long strip used for playback through a projector. Current video technology follows the same frame-based concept as film, with some variation. A video camera rapidly collects a sequence of light images by scanning in horizontal movements across a light sensitive device and outputting a stream of "broadcast line" data which describes the image. Typically, a camera scans every other available line on the light sensitive device and alternates between line sets (odd and even) to create two, one-half frame "fields" which, when interlaced, form a full-frame image. Video has typically been recorded by video camera in analog format, but cameras which can record video in digital format are available. To transmit analog video via a computer, each frame or field input to the computer must be converted into a digital format or "digitized" for use. A computer screen is made up of thousands of pixels—programmable light units which can be instantly set and reset to emit light in one of the multitude of colors supported by the computer system. Typical monitors (ranging from 12–21 inches on the diagonal) contain matrices having resolutions of e.g. 640×512, 1,024×820, 1,280×1,024 and 1,600×1,280 pixels organized into rows of pixels stacked upon rows of pixels. Each pixel in the screen display requires a color assignment from the computer to construct an image. Computer display controllers contain a large memory space, called a bitmap memory, which allocates an amount of memory for each pixel unit on the screen, e.g. 640×512, 1,024×820, 1,280×1,024, etc. (Other screens which process and work on displays in background have the same size can also be defined in the bitmap memory.) The computer drives the monitor and creates images via the bitmap memory, writing pixel color assignments to its memory locations and outputting signals to the monitor based on those assignments. The digitization process creates a set of digital pixel assignments for each frame or field of video input.

During video capture a computer executes an analog-to-digital "A/D" conversion process—reading the provided film or video data (using specialized "frame grabber" hardware) and transforming the analog data into a stream of digital color codes, i.e. a bitmap data set for each frame or field of the motion picture. The data size of digital video stream depends upon the resolution at which the video was digitized. Resolution depends upon factors such as: i) frame resolution or frame size; ii) color depth; and iii) frame rate.

Frame resolution, or frame size, is the size in pixels of each digitized frame bitmap. Frame size does not need to be directly related to the monitor resolution in any computer configuration. Thus, while a monitor may have a resolution of 640×512 or 1,024×820, for example, a video can be digitized with a different resolution, such as 320×240. Video following the National Television Standards Committee (NTSC) standard for analog resolution digitizes to frames of 640×480, 320×240, 160×120 or other resolutions. Such video could well be displayed on a computer having a monitor resolution of 1,280×1,024 or other resolution.

Color depth specifies the number of bits used by the digitizer to describe the color setting for each pixel of a digitized frame bitmap. Computer pixel units typically output color following one of several color-generating systems. RGB (Red, Green, Blue) is one system which permits all the colors of an available palette to be expressed as combinations of different amounts of red, green and blue. Red, green and blue light elements or "color channels" are considered primary and can be blended according to color theory principles to form other colors. Electron guns fire beams to activate each of the light elements to different degrees and form colors that make up an image. The pixel assignments written to the bitmap memory control the settings used in the monitor to output colors using the pixels.

Computers vary greatly in the range of colors they can support, the number often depending on the size of the bitmap memory (an expensive item) and the size of the memory space dedicated to each pixel in the bitmap. Color systems that support a palette of 256 (or $2^8$) different colors allocate 8 binary bits (or one byte) to each pixel in the bitmap memory and make pixel color assignments by writing 8-bit numbers to those locations. Such systems are said to provide "8-bit" color. More advanced systems support palettes of 65,536 (or $2^{16}$) or 16,777,216 (or $2^{24}$) colors and hence allocate either 16 or 24 bits (two or three bytes) per pixel in the bitmap memory. These systems are said to provide "16-bit" or "24-bit" color. A 24-bit color system is said to display in "true color," or in as many colors as the human eye can discern. Video can be digitized to follow an 8-bit, 16-bit or 24-bit or other format. In the digitizing process, it is not necessary that the digitized video use the color format of the displaying computer. For example, it is possible using analog-to-digital conversion software to digitize a video in 16-bit color and display the video on a computer configured for 24-bit color. Most computers supporting color video have software available to make such translations.

Finally, frame rate is the speed at which the camera captures the video frames. Motion picture sequences give the impression of movement when images are displayed at a rates of more than 12–15 frames per second. Video cameras following the NTSC standard used in the United States output at 30 frames per second or 60 fields per second. Many frame grabbers can capture and digitize analog video at real time motion speeds of 30 frames a second. However, many frame grabbers digitize at lower speeds, such as at 15 frames per second. If the computer system depends on a frame grabber with a low frame processing speed, then frame rate would also be tied to the frame grabber's processing rate.

Using the variables of frame size, color depth and frame rate it is possible to make calculations showing the speed at which digitized video in a bitmap form flows into the memory of the processing computer. Video digitized at a relatively small 320×240 picture size, with 24 bit (3 byte) color depth) and a frame rate of 15 frames/seconds (sampling every other video frame) requires approximately 207 megabytes (Mb) of storage per minute. A video sequence digitized at a 640×480 frame size, a 24 bit (3 byte) color depth and a 30 frames/second rate would require approximately 1.54 gigabytes (Gb) of storage per minute of video. Both requirements clearly choke the disk storage capacity available on most commercially available hard drives which provide on the order of 1 Gb of space in total. Further, even if the processor available on the computers could feed the data for transmission directly to a remote terminal, the transmission capacity (i.e. the "bandwidth") of most communications systems used today are not capable of handling such a data flow in real time.

Commercially available modems can transfer data at rates of e.g., 28,000 baud, which translates roughly to 28,000 bits (3500 bytes) per second or approximately 2 Mb per minute—clearly not sufficient capacity to handle the 207 Mb per minute or the 1.54 Gb per minute requirements outlined above. An Integrated Services Digital Network (ISDN) connection provides greater transmission capability than most commercially available modems but still does not provide the capacity necessary for transmitting streams of video in bitmap data form. A typical ISDN Internet connection transfers data at rates approaching 128 kilobytes (Kb) per second (approximately 5.6 Mb per minute). Local area networks (LANs) have data rates that vary depending on the size of the LAN, the number of users, the configuration of the LAN system and other factors. Although LAN transmission rates widely vary, a typical Ethernet system transfers information at a rate of 10 Mb/sec. Faster Ethernet systems can transfer information at a rate of 100 Mb/sec.

The large amount of space required by digitized video data in bitmap form makes it largely impossible to make real time transmissions of such data given the current bandwidth of most network systems. Thus, researchers have searched for ways to "compress" bitmap data—encode the data differently so that it will take up less space but still yields the same images. Compression algorithms reduce the amount of data used to store and transmit graphic images, while keeping enough data to generate a good quality representation of the image.

Data compression techniques are either "lossless" or "lossy." A lossless compression system encodes the bitmap data file to remove redundancies but loses none of the original data after compression. A bitmap file which is compressed by a lossless compression algorithm and thereafter decompressed will output exactly as it had before it was compressed. Runtime length encoding (RLE) and LZW (Lempel-Ziv-Welch) encoding are examples of lossless encoding algorithms.

Lossless data compression techniques are useful and achieve compression ratios in ranges typically from 2:1 to 3:1 on average and sometimes greater. To achieve higher compression ratios such as 30:1, 40:1 or 200:1 (for video) and higher it may be necessary to use a "lossy" data compression algorithm. Lossy schemes discard some data details to realize better compression. Although a lossy data compression algorithm does lose pixel data within an image, good lossy compression systems do not seriously impair the image's quality. Small changes to pixel settings can be invisible to the viewer, especially in bitmaps with high picture frame resolutions (large frame sizes) or extensive color depths.

Frame-based image data, such as film or video, is an excellent candidate for compression by lossy techniques. Within each image it is possible to remove data redundancies and generalize information, because typically the image is filled with large pixel regions having the same color. For example, if a given pixel in a digitized image frame was set to the color red, it is likely that many other pixels in the immediate region also will be set to red or a slight variation of it. Compression algorithms take advantage of this image property by re-encoding the bitmap pixel data to generalize the color values within regions and remove data code redundancies. Such compression is called "spatial" or "intraframe" compression.

A second type of compression, "temporal" or "interframe" compression, relies on the strong data correlations that exist between frames in a motion picture sequence. From frame to frame the images are nearly identical with only small changes existing between frame images. Where one frame is already described, it is possible to describe the next frame by encoding only the changes that occur from the past frame. A frame compressed by temporal or interframe compression techniques contains only the differences between it and the previous frame; such compression can achieve substantial memory savings.

Reduction of bitmap data using either intraframe (spatial) or interframe (temporal) compression techniques facilitates the efficient storage and transmission of the otherwise massive bitmap data that makes up a digitized video transmission sequence. Currently, there are several commercially available algorithms (available as software and hardware tools) for compression and decompression of video.

The standard promulgated by the Motion Picture Experts Group and known as "MPEG" (with its variants MPEG-1 and MPEG-2) is one lossy technique widely used for film and video compression. MPEG-1 was originally developed to store sound and motion picture data on compact discs and digital audio tapes. MPEG standard compression uses both intraframe and interframe compression. An MPEG compression algorithm compresses a stream of digitized video data into three types of coded frames: I-frames, P-frames and B-frames. I-frames are single, stand alone frames which have been compressed by intraframe (spatial) reduction only. An I-frame can be decompressed and displayed without reference to any other frame and provides the backbone structure for the interframe compression. According to the *Encyclopedia of Graphic File Formats* (second edition) at p. 608, an MPEG data stream always begins with an I-frame. In typical operation, MPEG creates other I-frames every twelve or so frames within a video sequence.

P-frames and B-frames are frames which have been compressed using interframe (temporal) compression techniques. MPEG supports the elimination of temporal redundancies in a bi-directional fashion—an MPEG standard system will encode a difference frame based on comparison of that frame to the previous frame of video data and/or the next frame of video data. A P-frame contains data showing the differences occurring between it and the closest preceding P- or I-frame. A B-frame encodes change values found between that frame and the two closest I- or P-frames (in either direction, forward or backward) to that frame.

For all the advancement that MPEG brings to the field, it has not been widely implemented for video conferencing and other live video transmissions. While MPEG decompresses in real time, its compression algorithm is time-consuming even when implemented in hardware. Moreover, most implementations require a user to select a skeletal sequences of I-frames, a time-consuming process which all but limits most MPEG compression applications to non-real time settings. An MPEG-2 standard has been more recently developed for use in the television industry. MPEG-2 for example, handles interlaced video formats and provides other features specific to the television industry.

ClearVideo compression by Iterated Systems is another lossy compression system currently available which provides both spatial and temporal compression of video. Like MPEG-1 and MPEG-2, ClearVideo compression also compresses on a frame-by-frame basis and compresses using a selection of "key frames" (similar to I-frames) and "difference frames" (similar to P- and B-frames). Using fractal compression—a mathematical process of encoding bitmaps as a set of mathematical equations that describe the image in terms of fractal properties—for its encoding of still images, Iterated Systems states that it requires less key frames than its competitors, which results in smaller, more efficient files and requires less bandwidth to transmit.

Again, for all the promise and advancement ClearVideo compression offers, the system is not well suited for real time transmission of video images. While a Clear Video system may compresses well and allow for decompression in real time, it has limited utility for video conferencing and other live applications in its current implementation because its compression technique is slow—taking up to 30 seconds per frame, even when the compressing processor is a high-end Pentium™-type processor. Such a compression time is unacceptable for real time applications.

Thus, there is a need for an advanced system for real-time compression, transmission and decompression of video images, one that operates in real-time and within the constraints of computers that are used by the public and in the workplace. Such a system would provide rapid, real time processing of incoming video images and compress those images into a data stream that is easily and quickly transferrable across available networked communications systems. It would also be necessary that the compressed data be easily decompressed by a receiving computer and used to generate a high quality image. Such an advance would pave the way for real-time communications like those desired by the business and private users alike. Such an advancement—an easy format in which to store data more compactly than MPEG, ClearVideo or other available video compression techniques—would also lead to better ways to store and access video data.

SUMMARY OF THE INVENTION

The present invention provides a meshing-based system and method for motion picture compression, decompression, transfer, storage and display which is capable of real-time processing. The invention is particularly suited for applications such as video conferencing and other applications where real time capture and storage or transmission of video data is needed. The system of the present invention is lossy, in that a geometric mesh structure which achieves good compression replaces the multitude of pixel values or other picture-making elements that make up a digitized image. However, the lossiness of the meshing system is easily adjustable and can be varied to suit factors such as available bandwidth, available storage capacity or the complexity of the image. With the system and method of the present invention compression ratios of on the order of 100:1 or higher are possible for real-time applications using available computer hardware.

To gain such compression, the present invention provides a technique for representing a motion picture sequence that is removed from the frame-based approach traditionally used to capture and process motion picture information. As described above, video technology is synchronous and frame-based—meaning that most video devices supply and store a frame of image data for each video frame in the motion picture sequence. Thus, for typical compression systems currently available, there is a one-for-one synchronous approach taken in accordance with the frame-based nature of motion pictures.

The present invention breaks with that tradition and uses an asynchronous, non frame-based meshing technique to compress video data more swiftly and more compactly than the frame-based systems currently available. The system of the current invention constructs a model from the picture-making elements available to the computer. In the exemplary embodiment, the system of the current invention constructs the model using selected pixel points from the digitized video frames. However, it is understood that in addition to pixel point values, the system of the present invention could use other picture data in the model such as wavelets, Fourier components or IFS maps. The system builds the model by inserting the picture elements into a model structure and updates the model by changing picture elements (adding new picture elements or deleting old elements) so that the model reflects the current image of the motion picture sequence at any given instance. Using the mesh modeling system, the present invention does not need to represent video as a sequence of image frames, but can instead represent the video by a single model which is continuously updated by point addition or removal. A sequence of simple commands to add or remove image elements adjusts the model so that it reproduces the motion picture sequence.

In an exemplary embodiment, the present invention uses a triangulated polygonal mesh as the model structure. Traditionally, triangulated mesh constructions have been used to create computer models of objects and surfaces, typically in 3D. In those applications, a 3D object modeling system uses a set of 3D spatial (X, Y, Z) coordinates to create a "wireframe" mesh structure made up of interconnected, irregular triangles that describe the surface planes of the object. A 3D object modeling system builds the object model by connecting lines between the selected data points to form the triangles. Each triangle in the model represents a plane on the surface of the object.

The Co-Pending Application (which has been expressly incorporated by reference herein) shows that it is possible to incorporate color data and spatial data into a single triangulated mesh construction. For the creation of 3D object models, the Co-Pending Application describes a system that can merge spatial X, Y, Z, values with ;corresponding color values (such as RGB pixel settings) and use those combined 6D (X,Y,Z,R,G,B) values to construct a mesh model which reflects both the spatial forms of the object and its surface details. In one embodiment of that system, the computer adds points incrementally to a basic, initial mesh construction and increases detail of the model by adding additional points. The computer adds points based on the significance of the point in terms of contributing either spatial or color detail.

In the Co-Pending Application, it is also noted that the technique of creating mesh constructions for 3D objects using both spatial and color values can also be used to create mesh constructions for 2D images. In applying the 3D technique directly to the problem of modeling 2D images, it can be seen that the bitmap data, i.e., the x, y and RGB pixel data, from a 2D image is very much analogous to the 3D image data that would be available from a flat, planar object marked with many surface details. The set of "5D" x, y, R, G, B pixel values which make up a bitmap image would largely correspond to the 3D values for the planar object. Thus, just as a surface of a 3D object could be represented in a set of colored triangles, 2D images can also be represented as a series of colored triangles. The triangle mesh provides the structure for that image in a way that dramatically reduces the amount of data needed to create a high quality representation of the image.

The present invention expands upon the teaching of the Co-Pending Application by applying the meshing technique to motion picture sequences. A computer compressing by the system and method of the present invention creates an image model using the pixel point data from the initial digitized field of video data, selecting pixel points which are most significant in describing the image and inserting them into the mesh. The compressing system then updates that model by adding and removing points from the mesh. For a video transmission, such as video conferencing, a sending and receiving computer both maintain image models. The sending computer processes the data to compress it as described above and then transmits to the receiving computer a sequence of encoded ADD and REMOVE commands. The commands provide information so that the receiving computer can maintain a triangulated mesh that is an exact copy of the mesh at the sending computer. Based on this model, the receiving computer outputs a display of the motion picture image.

As the sending computer captures and digitizes video (such as a live video feed), an add function scans the bitmap data input by the frame grabber and determines which points from that frame should be added (following a process to locate bitmap data points which would add significant detail to the mesh). The add function then inserts the points into the model and outputs an ADD command to the receiving computer so that it can update its mesh accordingly (as described below). To locate points of significance the add function orders all the points of the new frame in terms of their significance in adding new detail to the existing model through a process which evaluates the color of each new data point in relation to the color of the same point currently in the model. Through this ordering process, the points which effect the image most are discovered and added to the model immediately.

The second process is the remove function which, like the add function, scans data input from each new digitized video field. However, unlike the add function, the remove function determines which points must be removed from the current model by establishing that they no longer apply to the current image. In the $\frac{1}{30}$ of a second that exists between the input of data from each field the present invention, configured with the add and remove functions, can make point insertions on the order of magnitude of 1000 point insertions per interval (on currently available hardware) and any number of point deletions per interval. However, the number of point insertions and deletions made can be tailored to suit the desired image quality or the available bandwidth of the transmission system.

The addition and removal of points to and from the mesh creates corresponding changes to its structure. Adding a point also adds additional triangles. Deleting a point removes triangles. The addition and removal procedures will also cause related changes to the structure and configuration of the mesh in the areas around where the point addition or removal occurs. In mesh building, it is an aspect of the present invention that it follow a procedure to optimize the construction of structure throughout each point addition or deletion. Although the computer can be configured to optimize the mesh structure by many different procedures, in the exemplary embodiment the present invention optimizes by the principles of Delaunay optimization. When the triangulation follows Delaunay principles, a circumcircle defined by the vertices of a triangle will not contain another data point of the mesh. When the triangle in question does include another point within its circumcircle, that configuration must also be configured by "flipping" the common edge that exists between the two. The Delaunay triangulation optimality principle helps to insure that the mesh of irregular triangles maintains a construction of relatively evenly sized and angled triangles. It is currently recognized as one sound process for optimizing triangulated mesh constructions. The modeling process uses the add and remove functions with Delaunay principles as explained in further detail below.

The remove function works to update the mesh model at the sending computer and outputs REMOVE commands to the receiving computer. It is an aspect of this invention that the computer at the sending location specially encodes each ADD and REMOVE command so that each are in a very compact form before being sent to the receiving computer. Each ADD or REMOVE command contains information about the intended operation, e.g., "ADD x, y R G B". However, before each function transmits a command, it first encodes the command (in the process described below) so that it takes up less space.

The receiving computer accepts each encoded ADD and REMOVE command and then outputs a display. The receiving computer also uses the model information to output the motion picture display. It is an aspect of the invention that it does not generate an entire new frame each time the images need to be updated. Instead, the present invention draws locally. Using the mesh model the computer draws (and redraws) triangles only as necessary to update the image. When a point is inserted or deleted the adding or deleting procedure will require an adjustment of the triangles that exist in that region of the mesh. To maintain the display after each addition or deletion, the present invention redraws the triangles which have been affected by the point addition or deletion. Since many triangles in the mesh are not affected, they do not need to be redrawn.

Using functions like Gouraud shading, the present invention can quickly render an image based on these triangle settings. The image shifts as the computer updates the triangles, thus making a motion picture display.

The system presented employs computer equipment, cameras, a communications system and displays in the exemplary embodiment, as well as computer programmed elements to control processing. The elements of the system are detailed in the description below.

BRIEF DESCRIPTION OF THE DRAWINGS

FIG. 1b Depicts a mesh model construction which represents the bitmap image of FIG. 1a.

DETAILED DESCRIPTION

System Overview

As stated above, the present invention operates through a mesh modeling system. The computer constructs a single image model through a meshing procedure. The meshing procedure represents the image in a set of interconnected triangles. As the images change in the motion picture sequence, add and remove functions alter the model, adding and deleting points through comparisons with the incoming bitmap data. The present invention does not need to generate a new model for each new image of the motion picture sequence. Instead, as the image changes, a processor (using the system and method of the present invention) will revise the model so that it reflects the new image. The system adds new points into the mesh to update the model and removes points from the model when they are no longer current.

To output a display of the image, the present invention "draws" the triangles which make up the mesh, filling their areas with colors based on the color assignments of their vertices through a rasterization process which prepares pixel assignments based on those triangles. As the motion picture sequence moves from frame to frame, the present invention does not need to completely regenerate pixel assignments for a full screen image frame. Instead, the present invention draws locally—drawing only the triangles from the model which have been added or changed by addition or deletion of points.

The system of the present invention uses drawing functions to draw the triangles which make up the image. When a computer also supports special gradient color features, such as Gouraud or Phong shading, the computer can draw triangles, the colors of which will vary according to the principles of those shading techniques. Gouraud shading assigns a color setting for each pixel within the triangular area by taking a weighted average of the colors of the vertices as determined by reference to the location of the point and each vertex. The basic drawing functions rasterize the R, G, B values of a triangle's vertex coordinates to create a set of R, G, B pixel values which render each triangle. For example, an equilateral triangle with two base vertices of the color purple and a third vertex of the color red will output as a triangle whose pixel value color progressively changes from purple to red.

Figure 1A:
FIG. 1a Depicts an exemplary bitmap image.
Figure 1B:
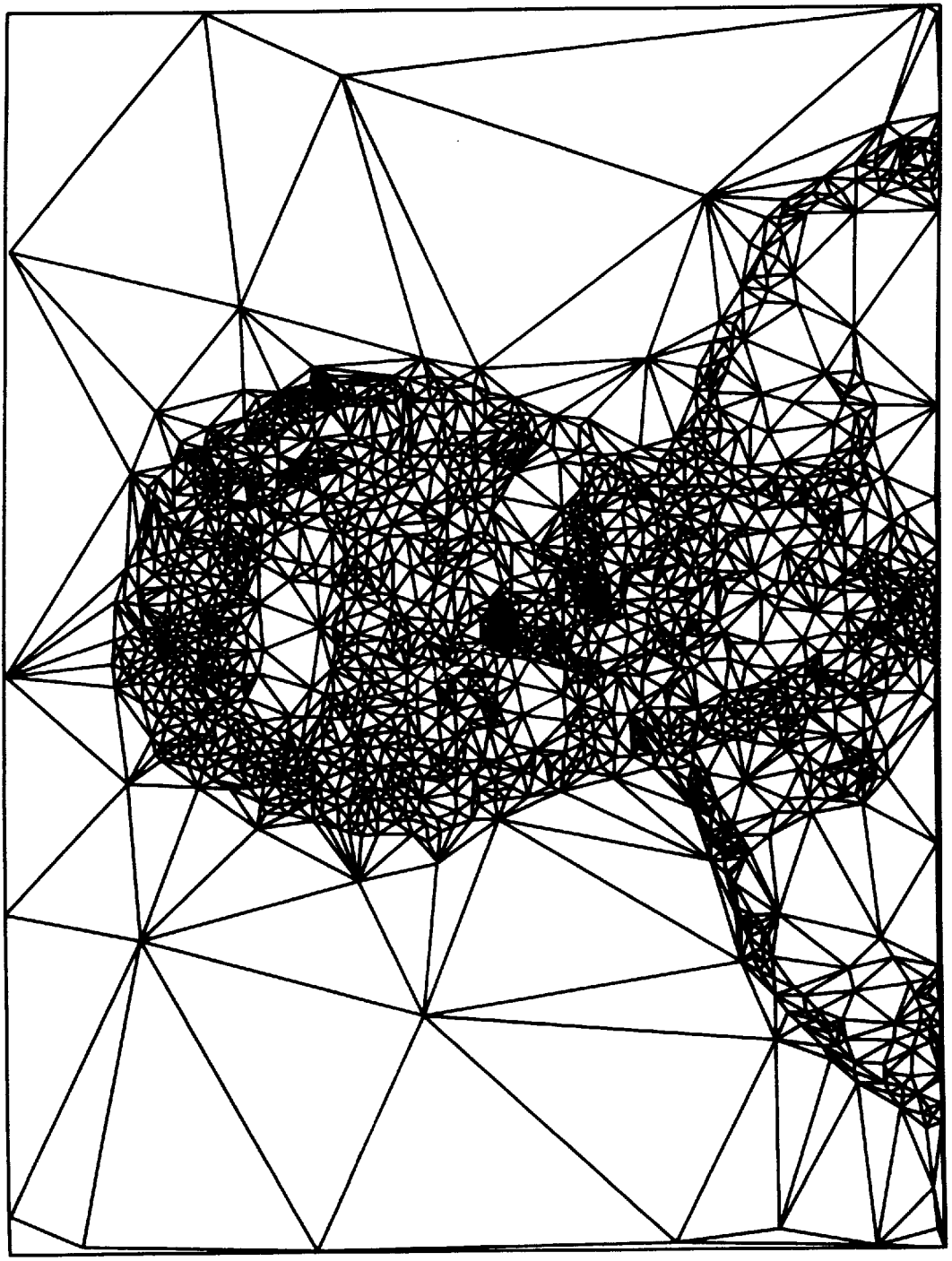
Figure 1C:
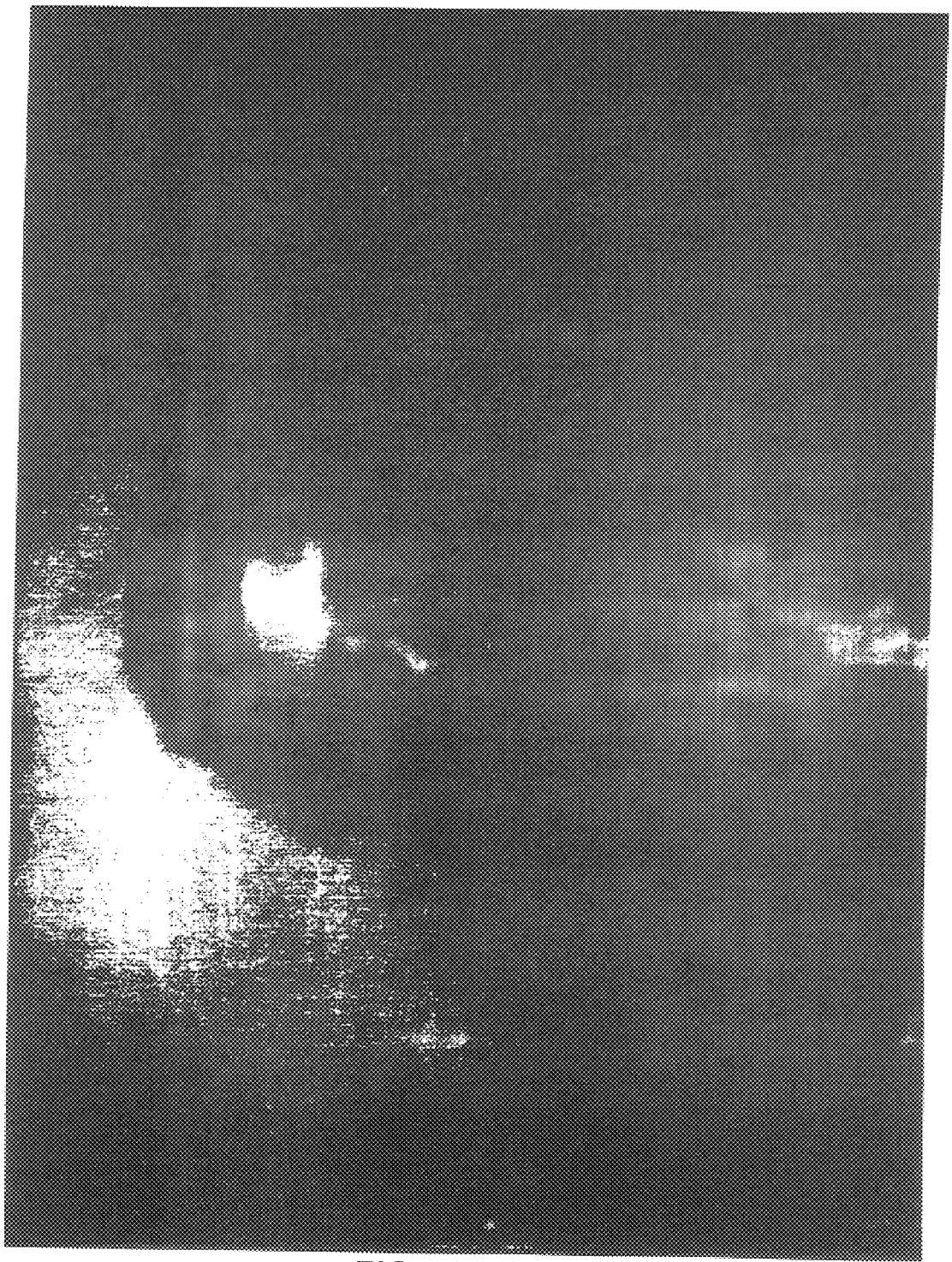
FIG. 1c Depicts an image rendered from the triangulation of FIG. 1b using Gouraud shading techniques.

The present invention's technique of constructing 2D images from a triangulated model results from the understanding that it is possible to approximate a bitmap image with a construction of colored triangles. When the colors of the triangles are rendered through a rasterization procedure which uses gradient rendering techniques like Gouraud shading, the output generated from a mesh model will produce a fine reproduction of the image, but will use far less data than the original bitmap. FIG. 1a depicts (in grey scale) a display of bitmap pixel data that has been generated by a frame grabber during a motion picture sequence (the bitmap image 1). Using the mesh construction techniques of the present invention, a computer configured according to the present invention will select points of important detail from such bitmap data and use those points as vertices in a mesh model that represents an image. FIG. 1b provides a triangulated mesh structure 2 which could be created from bitmap image 1 of FIG. 1a. The bitmap contains far less data then the original bitmap image file. A displaying terminal (such as a receiving terminal in a video transmission) can render a representation of the bitmap image 1 by rendering the triangles specified in mesh model 2 by rasterizing the color value associated with the vertices of each triangle. In FIG. 1c, display image 3 represents (in grey scale) the triangles of the mesh model drawn using Gouraud shading techniques. In an implementation transmitting digitized video from a sender to a receiver, the present invention provides that the computers at both sending and receiving locations maintain mesh models of the image at all times during, the transmission.

Figure 2:
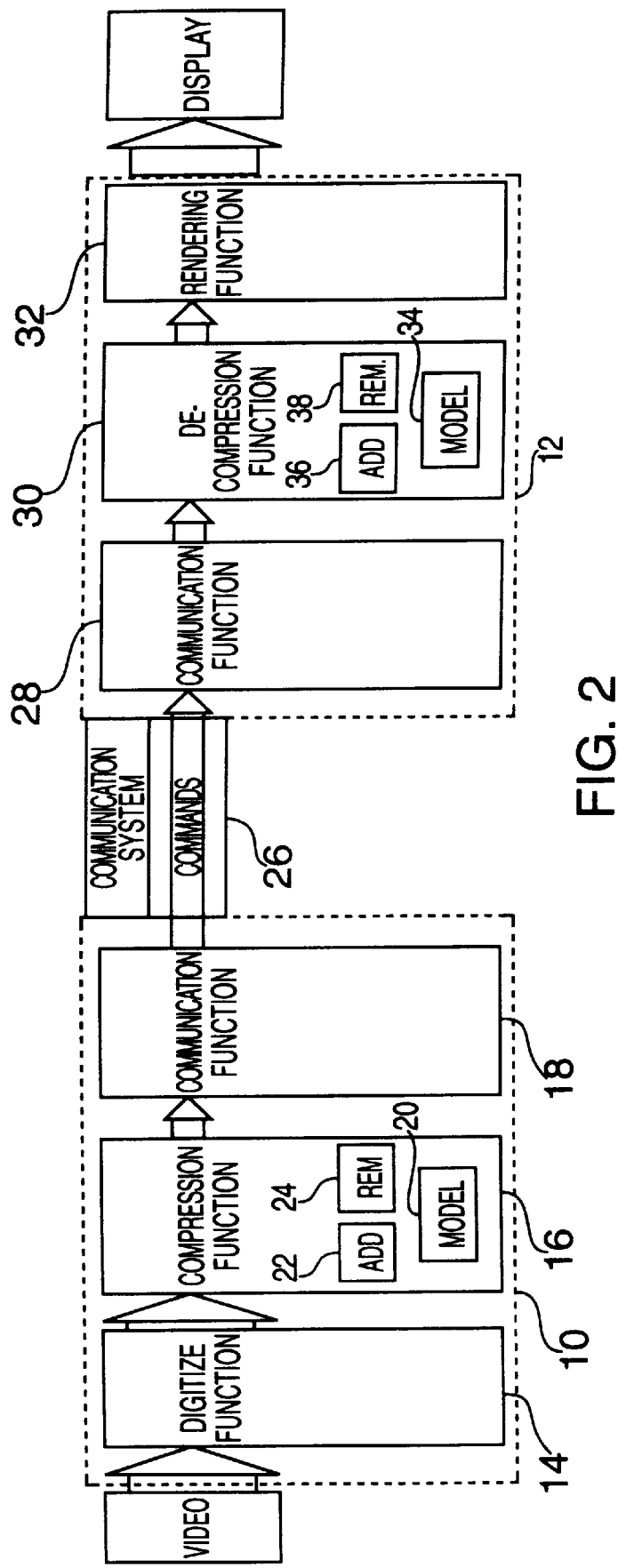
FIG. 2 Depicts an exemplary overview of the system functions of the present invention when configured for transmitting digitized video from a sending to a receiving computer.

FIG. 2 depicts an overview of the functions for transmitting digitized video from a sending computer 10 to a receiving computer 12. The sending computer IO executes the functions of transmitting the video data through its digital compression and communication functions (14, 16 and 18). Video can come from another source such as from a video camera or it can come from a pre-recorded source such as from a tape. The compression function 16 maintains a mesh model 20 (a triangulation) which reflects at any instant the current image in the motion picture sequence. To update the model, an add function 22 scans the bitmap data of each newly digitized frame to select points to insert into the model. A remove function 24 reviews the triangles in the mesh as it exists to determine whether the points of those vertices are still valid in the current image. The add and remove functions (22 and 24) process and then update the mesh model 20 at the sending computer 10 and output a sequence of ADD and REMOVE commands to the receiving computer 12 across a communications system 26.

Using the system and method of the present invention, an entire video sequence can be compressed into a stream of ADD and REMOVE commands. The compression function 16 employs indexing systems to encode information such as vertex and color references so that each ADD and REMOVE command can be encoded for extreme data compaction. Thus, rather than transmit a longhand command such as "ADD x, y, R, G, B" or "REMOVE x, y, R, G, B" the compression function 16 transmits an encode d instruction easily transmittable a cross a narrow bandwidth communication system.

The receiving computer 12 executes a communication function 28 (to receive commands), a decompression function 30 and rendering function 32. The decompression function 30, like the compression function 16, also maintains a triangulated mesh model 34 that reflects the current image of the motion picture sequence. The decompression function 30 decodes each ADD and REMOVE command adding points to the model 34 and removing points from it, accordingly, following the command sequence. An add function 36 of the decompression function 30 executes each decoded ADD command to input points into the mesh model 34 (based upon the input commands) and output triangle drawing instructions for the changed triangles to the rendering function 32. A remove function 38 executes each decoded REMOVE command to delete points from the mesh. That function also outputs instructions to the rendering function 32 to redraw those triangles affected by the point removal. It is a particular aspect of the invention that in making changes to the model the present invention does not need to redraw the entire triangulation (or redraw the entire image "frame") each time the image changes. Instead, the present invention redraws locally, redrawing only those triangles that are created or affected by an ADD or REMOVE command in each instance.

Figure 3:
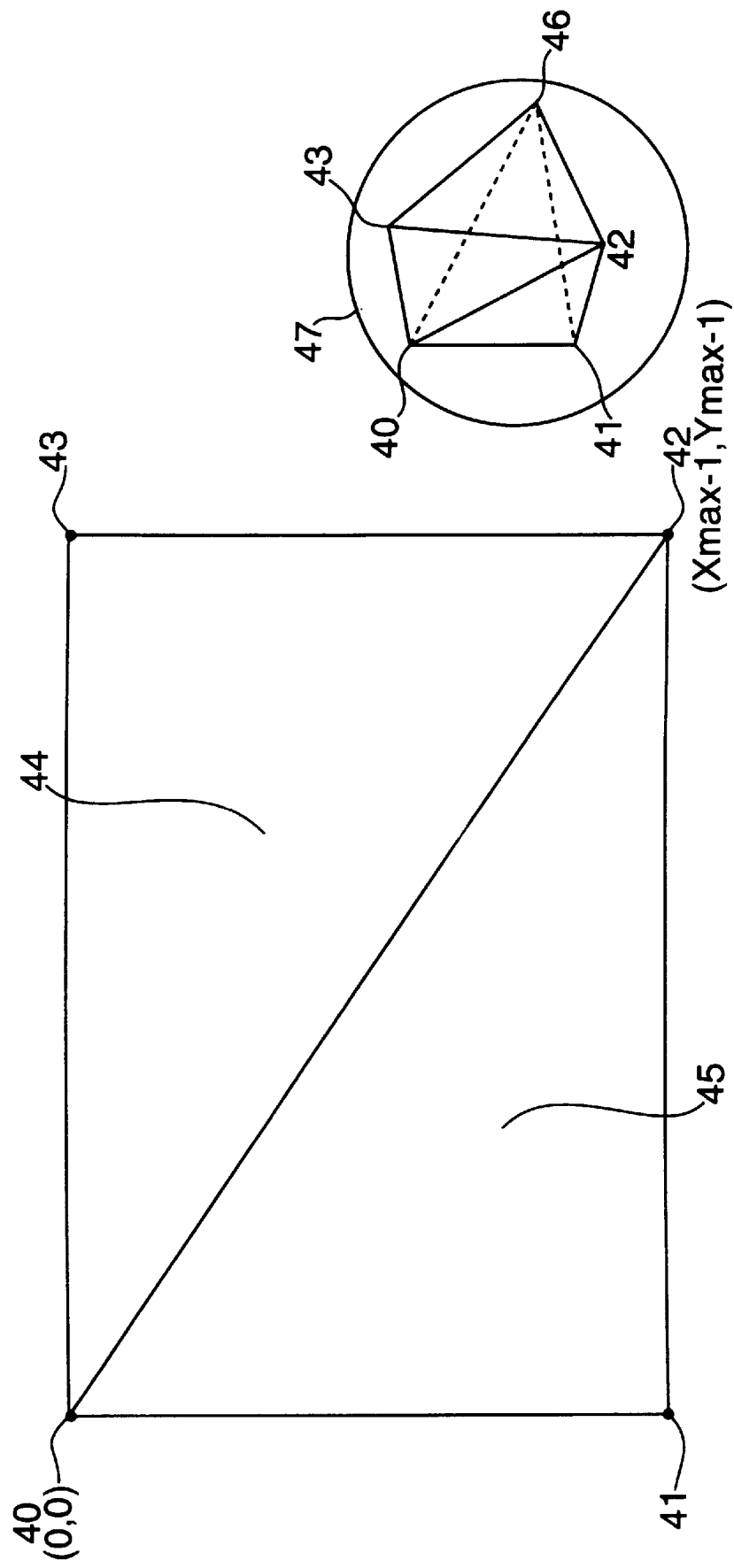
FIG. 3 Depicts an exemplary initial mesh of two triangles with boundaries based on the parameters of the frame size.

To triangulate, the compression and decompression functions (e.g., 16 and 30) initiate identical mesh structures before the compression/decompression process and have their respective structures ready to accept the input of bitmap pixel values. An exemplary initial mesh construction is depicted in FIG. 3. The initial triangulation is a rectangular structure using four initial points (40–43) to create two interconnected triangles (triangles 44 and 45). The rectangle is sized from (0,0) to (X-max-1, Y-max-1) to create a planar area large enough to bound the bitmap image and contain the pixels which will be input into the mesh from the bitmap images. Thus, if the image size of the incoming video is 640×480 pixels, the X-max and Y-max values are sized accordingly. To insure that each mesh triangle always has three neighbors, implementation can include an additional Steiner point (such as point 46) as depicted in insert 47 in FIG. 3.

In constructing the initial mesh, the present invention also assigns the initial four points (40–43) a base color. Many colors could be chosen for the initial four points, such as white, black or a neutral grey tone. In the exemplary embodiment, the computer system of the present invention will set the initial color of the initial four points to the color black (e.g., R=0, G=0 and B=0). The advantage of such a setting can be seen as follows. To locate a point to add into the mesh, the system of the present invention rasterizes a set of R, G, B pixel assignment values for the area bounded by a mesh triangle and compares each of these computed values against the R, G, B pixel assignment values for the corresponding pixel in the input video frame. When the R, G, B values for an image frame pixel varies widely from the computed R, G, B values for the corresponding pixel, the add function 22 inserts the point into the mesh. As the four vertices of the initial mesh structure in the exemplary embodiment are all set to black, all pixel comparisons for the initial set of incoming bitmap pixels will be against black. By using black as the color for the initial triangulation, the pixel scanning process (as discussed below) will locate first the points of light (light color values) as points that add significant detail. Thus, the use of a black initial background speeds the finding of contrasting light points can help to develop a mesh image more rapidly.

Figure 4A:
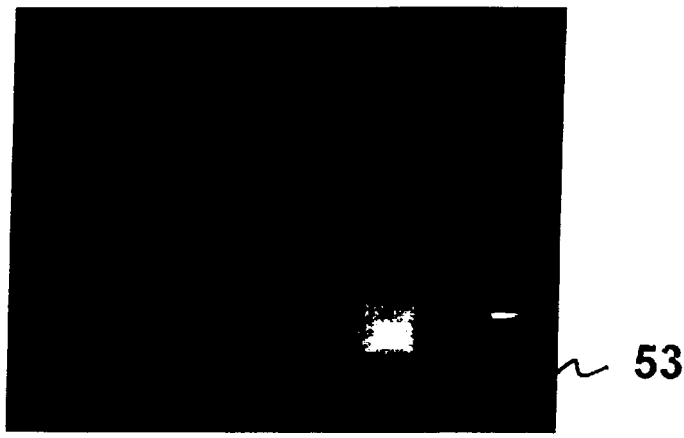
FIGS. 4a–j Depicts sequence of mesh transformations and related renderings that occur when a stream of video data is processed by the system and method of the present invention.
Figure 4A:
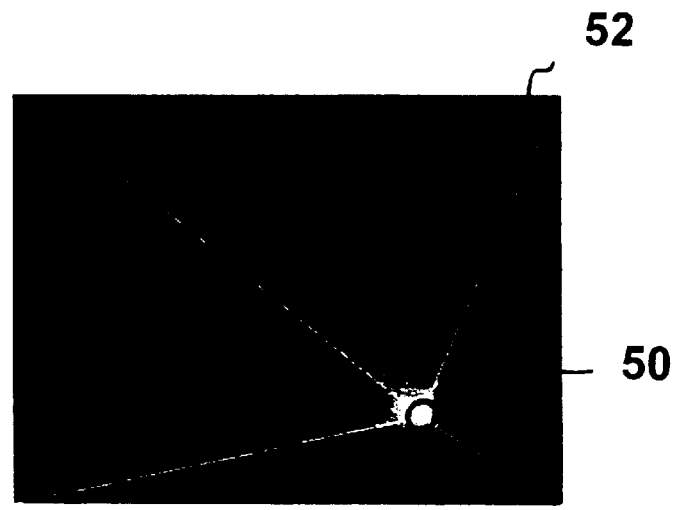

FIGS. 4a–4j depict a sequence of mesh transformation that occurs when a stream of video data is processed by the system and method of the present invention. (For reference, Appendix I contains larger sized copies of the depictions in FIGS. 4a–4j.) FIG. 4a depicts exemplary mesh configuration 52 after insertion of one point. Its output creates image 53. At that time, the digitizing function 14 (using a frame grabber) sends a bitmap pixel assignment from a video field to a frame buffer. The compression function 16 (FIG. 2) springs to work immediately and compresses bitmap information using the mesh model 20 (initialized as described above). The add function 22, in its rasterization process, begins a comparison process that will locate for each triangle in the mesh bitmap image points which should be added into the mesh. To make the comparison in the rasterization process, the add function 22 generates R, G, B pixel values for one of the two triangles in the initial mesh. By comparing those rasterized R, G, B values against R, G, B values of a pixel in the image frame, the processor can find the one pixel which differs the most from its counterpart rasterized R, G, B value. For example, in FIG. 4a of all the pixel values compared for that triangle, the processor found point 50 to be the most significant point of detail to add to the mesh, the system adds point 50 into the mesh.

The system moves from triangle to triangle, rasterizing R, G, B values for comparison against the pixel values in the image frame and inserting for each triangle compared the point which differed the most from the corresponding rasterized points.

After each point addition, the add function 22 also outputs an ADD command (encoded according to the system as described below) which is in turn transmitted to the receiving computer 12. (Initially the remove function 24 also operates, but in the initial field there are no points to remove.) The add function 22 continues to make comparisons between colors determined by the triangles in the mesh 20 (as currently constructed) and pixel assignments from the input fields which correspond to the mesh triangles.

Figure 4B:
Figure 4B:
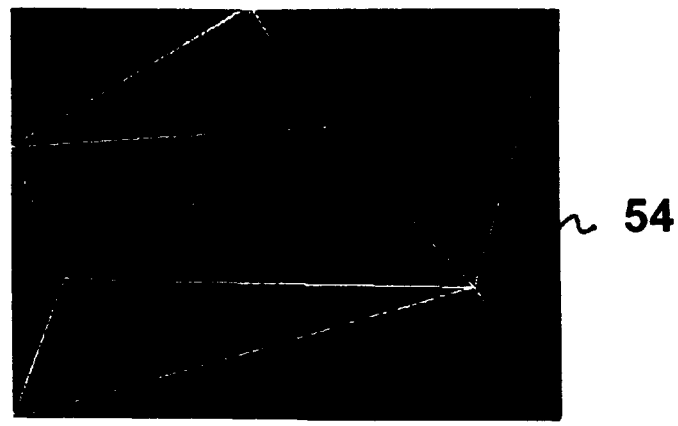
Figure 4C:
Figure 4C:
Figure 4D:
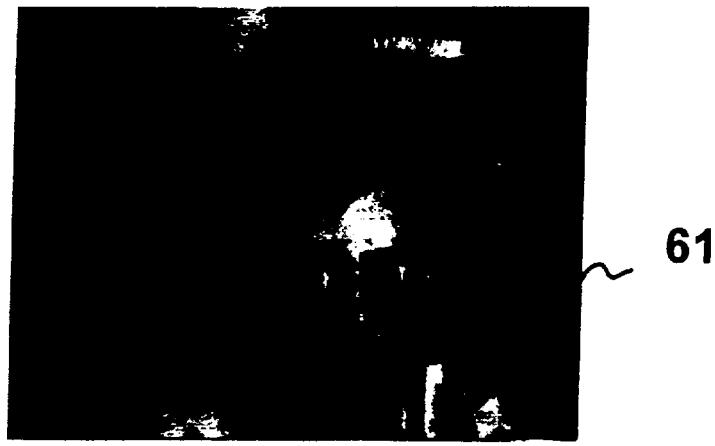
Figure 4D:
Figure 4E:
Figure 4E:
Figure 4F:
Figure 4F:
Figure 4G:
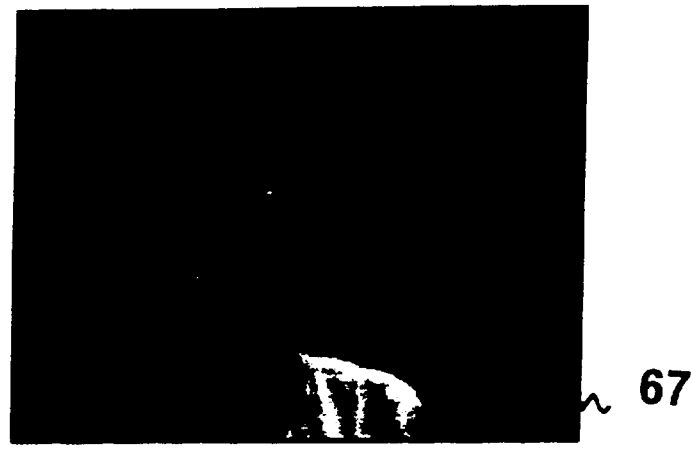
Figure 4G:
Figure 4H:
Figure 4H:
Figure 4I:
Figure 4I:
Figure 4J:
Figure 4J:

FIGS. 4b–4f depict the further growth and development of the image according to the comparison process of the present invention. Mesh 54 of FIG. 4b shows a mesh construction after the processor has made a few more point insertions. FIG. 4c depicts a mesh (56) after even more point insertions. As can be seen in the rendering (57) some details are beginning to emerge after less than 100 point insertions. In FIG. 4d, the figure begins to emerge in mesh 60. The mesh construction now contains several hundred points. The rendering of the image (61) also shows that the system can achieve a fairly good rendering of the image with relatively few points. A processor using the system and method of the present invention could create a mesh of this quality within 2 or 3 frames of incoming video. FIGS. 4e and 4f depict the further development of the image (through meshes 62 and 64) as the computer continues to add more and more points into the mesh. An image of the quality of the mesh 64 of FIG. 4f could be constructed using the system and method of the present invention in roughly 4 frames of video.

During processing of the initial video field from FIGS. 4a–f, the remove function 24 is also processing, but removes very few data points. However, in successive fields, the remove function 24 will play a substantial role in updating the model.

FIGS. 4g–4j depict the meshing process after the compressor has processed a few more fields. Time is now later, sometime after the processor generated meshes 50–64. The digitizing function 14 however, continues to deliver new video fields and the add 22 and remove functions 24 continue processing to update the model 20. Mesh 66 in FIG. 4g indicates that the image is beginning to change from the past field because the person depicted is beginning to raise his hand and in mesh 68 of FIG. 4h, the hand appears.

As each new field comes to the system, the remove function 24 proceeds through the list of mesh triangle vertices, comparing the color settings of the vertices to the color setting of the bitmap pixels in corresponding image frame (bitmap field) x, y locations. When the color setting of a mesh triangle's vertex differs widely from the corresponding pixel assignments in the field bitmap, the remove function 24 deletes that point from the mesh. When a data point is removed, several triangles are deleted. Removal will also cause a general reconfiguration of the triangles in the region of the revised triangles. The intricacies of point removal are described in further detail below.

As the remove function 24 deletes triangles, the add function 22 adds triangles through point additions. The meshes in FIGS. 4i and 4j 70, 72 (and the corresponding renderings 71, 73) show further movement and changes to the mesh structure as the scene changes.

As can be seen, a triangulated mesh structure (e.g., meshes 62, 64, 66, 68, 70 and 72) even while being relatively detailed contains many fewer data points than the bitmap data points created through the digitization process. However, the image generated from the mesh model only approximates the original bitmap, it does not reproduce all of the bitmap details. As the triangles—when output through a graphic rendering system—generalize the colors within each triangle (even using gradation techniques like Gouraud shading) the system and method of the present invention loses detail and hence is "lossy." However, because the system and method of the present invention can pinpoint the pixels of most significant detail, detail loss is kept to a minimum. The compression technique presented also provides both intraframe (spatial) and interframe (temporal) compression by its modeling and updating processes. The mesh modeling system provides intraframe compression, because it covers with one triangle (and color assignments for only three vertices) data assignments for an area which would otherwise require a lengthy set of color assignments for its many pixels. Second, the system and method of the present invention provides interframe compression, because it updates each successive image only in areas where the image has changed. The add and remove functions (22 and 24) are programmed to make changes locally rather than regenerating a whole new frame. To effect a change, the system either adds a point or removes a point into the mesh. Each point addition or removal only affects a small region of triangles in the location of the point addition or removal. The system achieves interframe compression by sending only the change information as a sequence of ADD or REMOVE commands.

System Components

Figure 5:
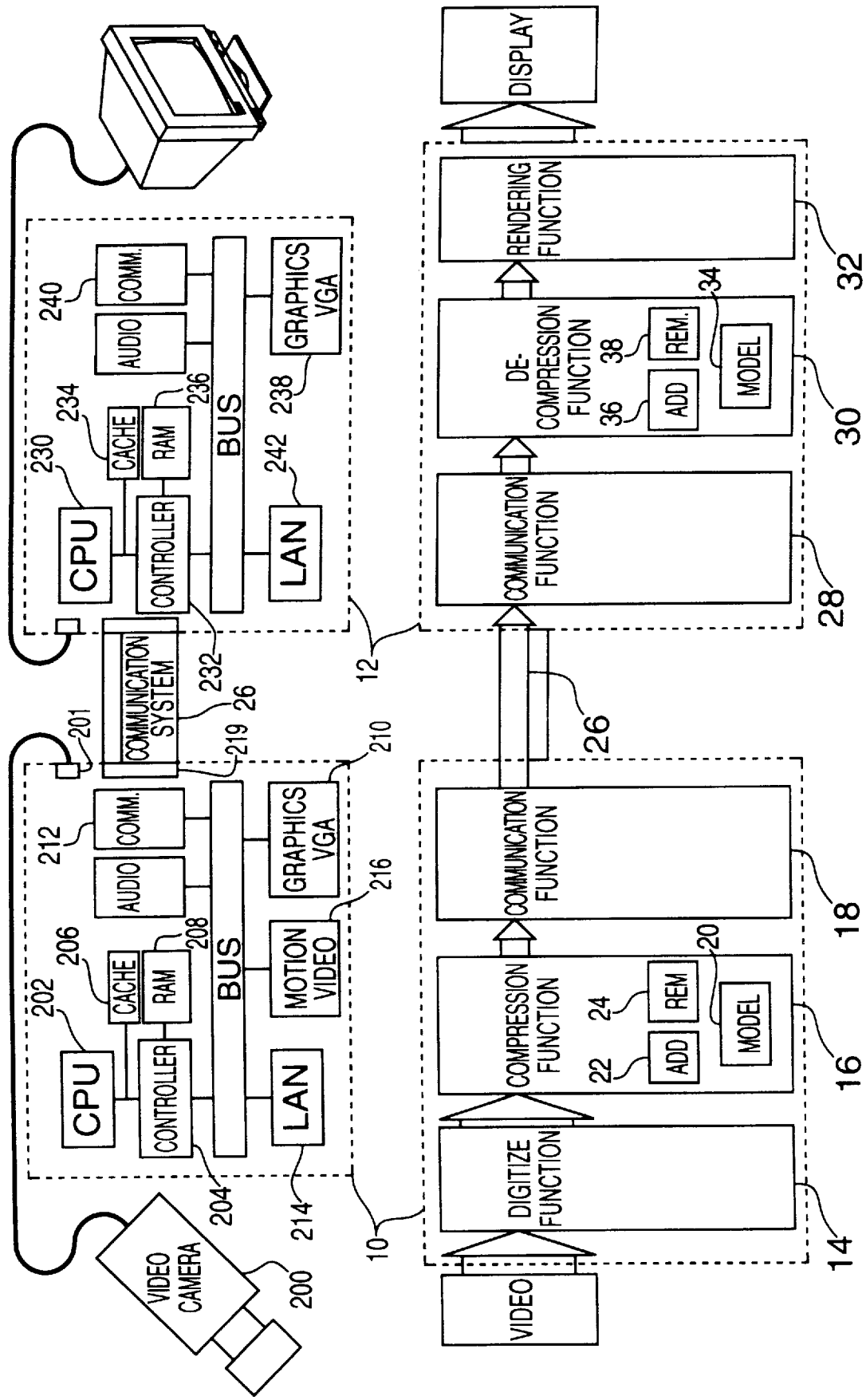
FIG. 5 Depicts a configuration of components used to implement an exemplary system for transmitting video from sending to receiving computer.

FIG. 5 depicts an exemplary configuration of components for the present invention (set forth for reference along side the overview of the system functions of FIG. 2). When configured for transmission of digitized video, such as in video conferencing or the transmission of recorded video, the sending computer 10 transmits a moving picture sequence to a receiving computer 12 across the communications system 26. Other exemplary applications are described below with reference to FIGS. 24 and 25.

Using video conferencing as an example, a video camera 200 coupled to the sending computer 10 records a sequence of images, live and in real time (at speeds such as 30 frames or 60 fields per second) and outputs that live video feed (in e.g., NTSC or other format) to the sending computer 10. It is understood that video cameras such as those outputting in digital or other formats could also be used with the compression system and method of the present invention (with adjustments made for the sending computer 10 to capture the data in its digital or other format). A video camera outputting in analog format can be coupled to the video port 201 of the sending computer 10 and will deliver its stream of captured video frames through that port. When the video feed arrives at the sending computer 10, the computer 10 executes the digitizing function 14 to convert the analog video into a stream of digital data (with the digitizing function 14); compresses or encodes the video data (using the compression function 16) and transmits that compressed data as a series of encoded ADD and REMOVE commands to the receiving computer 12 (with the communication function 18).

To execute those functions, the sending computer 10 comprises a central processing unit (a CPU 202) coupled (e.g. by bus architecture and memory controller 204) to a memory cache 206 and block of RAM chip memory 208. The CPU 202 of the sending computer 10 is also coupled to additional graphics processing devices, such as a video graphics array (e.g., VGA or SVGA) card 210 or devices for rasterization such as a graphics card for Gouraud and Phong shading and rendering). The computer also comprises communications hardware such as a modem 212 or a LAN connection 214. To process incoming analog data, the sending computer 10 either includes on the VGA card 210, or carries in a separate slot connection, a video frame grabber 216 with live motion capture capability. The frame grabber 216 permits the computer 10 to capture video in real time and digitize the stream of video images into digital bitmap fields having a picture resolution such as 160×120, 320×240 or 640×480pixels per frame and, e.g., 8, 16 or 24 bit color depth. As the streams of analog video frame data come to the sending computer 10 via the port 201, the frame grabber 216 makes the analog to digital conversion and writes each field to a designated and allocated RAM.

Although many different combinations of processors and hardware components are suitable for implementing the system and method of the present invention, the sending computer 10 could be configured with:

| | |
|---|---|
| Processor (CPU): | Intel Pentium ™ or higher (Pentium ™ 120) |
| Storage: RAM: | 8 Mb of available RAM |
| Video Card: | Optional SVGA display hardware for accelerated 24-bit color output and other hardware for Gouraud shading functions |
| Frame Grabber: | Capable of putting uncompressed video in memory and 15 frames per second or higher |
| Operating system: | Any graphics-capable operating system such as Microsoft Windows |

As the frame grabber 216 delivers digitized video, the CPU 202 of the sending computer 10 executes a set of programmed elements to perform the compression function 16. The program elements and related data structures are described in detail below with reference to FIGS. 7 through 21. As stated above, the add function 22 continually updates the mesh using the rasterization process discussed above and outputs add commands. The remove function 24 also scans the bitmap of data from each new video field, determines which points must be removed from the current model and outputs encoded REMOVE commands. The communications function 18 transmits the sequence of ADD and REMOVE commands to the receiving computer 12. The CPU 202 supports distributed multi-tasking/multi-threading and can execute the add and remove functions as either multi-threaded (asynchronous) or serial processes. When the system implements the add and remove functions as a multi-threaded (asynchronous) process, the operating system handles conflicts when both processes attempt to access the mesh to add or remove a data point. Each of the processes of the add and remove and their related functions is described in more detail below.

To output the sequence of encoded ADD and REMOVE commands the CPU 202 is coupled to a communications device such as a modem 212 or a LAN connection 214, which is in turn coupled to the communications system 26. The modem 212 translates a set of digital data into signals for transmission of the signals across the communication system 26 such as a telephone network. For communications by modem, a modem operating at a speed in the range of 28,000 baud or higher is suitable.

For purposes of an exemplary embodiment, an $O_2$ computer manufactured by Silicon Graphics Incorporated would be suitable for the sending computer 10. The $O_2$ Computer possesses an $O_2$ or analog (NTSC) video input, 128 Mb RAM, 5 Gb hard disk space and 100 Mbit Ethernet capacity. It is understood that similar computers sold and distributed, for example, by IBM, Apple Computers or others are also suitable. For more information concerning the $O_2$ computer the reader is referred to the information and references listed at the following Web Sites which are incorporated by reference herein: http://www.sqi.com/products/desktop/tech.html.

The communications system 26 carries the sequence of encoded commands and can be any system which carries data from the sending terminal 10 to the receiving terminal 12. In one embodiment, the communications system 26 is a telecommunications system configured to transmit analog signal data. The communication system 26 provides an international delivery system and enables the sending computer 10 to send data to and receive data from many remote source locations. In an alternative embodiment the communications system is a local area network (LAN), such as an Ethernet system, configured to transmit digital data in a range of 64K bits ISDN or higher. In the exemplary embodiment depicted in FIG. 5, the communications system 26 is a telecommunications based system (such as the Internet) and is coupled directly to the sending computer 10 by a transmission line running directly from port 219 of the sending computer 10 to the communications system 26. The port couples communication system 26 to the CPU 202 through its bus architecture and communication device (e.g. 212). The CPU 202 also uses communications software to facilitate data transmissions to and from the communications system 26. The communication function operates in parallel to the compression function 16 of the present invention.

The receiving computer 12 executes functions of communication 28, decompression 30 and rendering 32 when in a communications link with the sending computer 10. To execute those functions, the receiving computer 12 comprises a central processing unit (a CPU) 230 which is coupled via a bus architecture and/or memory controller 232 to an executable memory cache 234 and a block of RAM chip memory 236. Using those memory spaces, the CPU 230 executes program elements to carry out the process functions described above. The CPU 230 can also be coupled to additional graphics processing devices, such as a VGA or SVGA 238 or other devices for rendering or rasterization functions such as graphics cards for Gouraud or Phong shading. Many different combinations of processors and hardware components are suitable for the components of the receiving computer 12. For purposes of an exemplary embodiment, the receiving computer 12 could be configured with the hardware components described above.

The decompression function 30 of the receiving computer 12 processes the sequence of encoded ADD and REMOVE commands using the same basic model building functions—add and remove functions (36 and 38)—that compression process 16 uses. The add function 36 of the receiving computer 12 inserts a point into the image model 34 (as directed by an ADD command) and then sends an instruction to the rendering function 32 to draw the new triangles created by the point addition and redraw each triangle affected by it. The remove function 38 deletes points from the mesh model (as directed by a REMOVE command) and also outputs drawing commands to the rendering function 32.

To display an image, the rendering function 32 draws groups of triangles as determined by the vertices and faces of the mesh model. The rendering function 32 draws "locally" redrawing triangles in small groups when they are affected by an ADD or REMOVE command. In an exemplary embodiment, the render function 32 invokes the VGA's display controller and a graphics library of functions to draw the triangles. Using available software to implement gradient shading like Gouraud shading, the receiving computer can quickly update the image by drawing groups of triangles based on the mesh model information.

Figure 6:
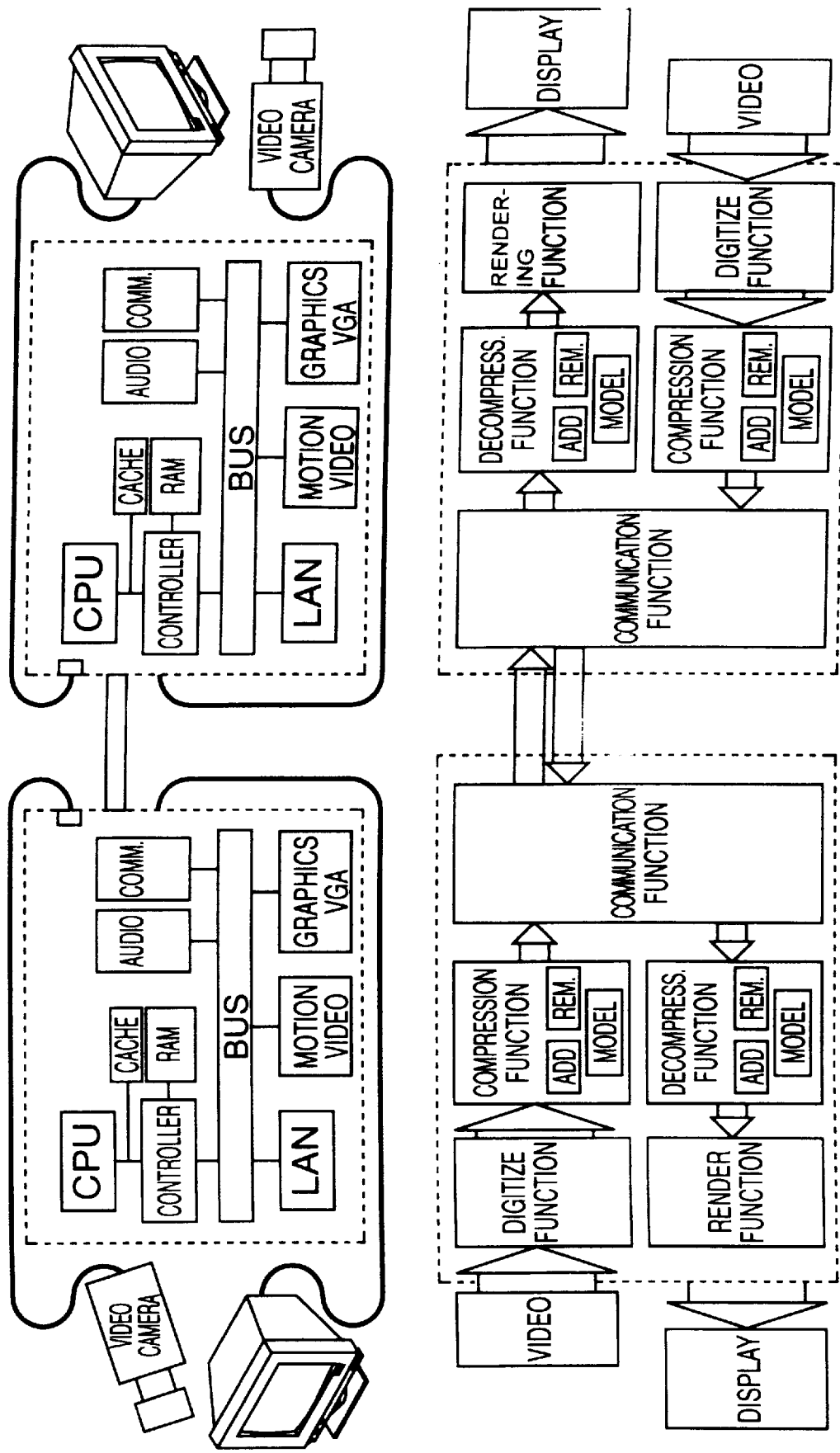
FIG. 6 Depicts an exemplary configuration of components for a two-way video transmission system such as that used for video conferencing.

The transmission system of FIG. 5 can be further adapted for applications such as two-way video conferencing. FIG. 6 depicts a configuration for a two-way video conferencing application and also provides an overview of the system functions. In FIG. 6 both computers contain equipment for sending and receiving images. Thus, each terminal must have a capable frame grabber and rendering functions like Gouraud shading, in addition to the other components described above.

Program Elements of Data Structures

The CPUs (202 and 230) of both sending and receiving computers (10 and 12) execute the instructions of a number of programmed elements to provide the compression and decompression functions (16 and 30) of the present invention. In the exemplary embodiment, programmed elements are written in the C++ programming language. For more information on the C++ programming language and programming structures, the reader is referred to the following publications which are expressly incorporated herein by reference: *The C++ Programming Language*, Bjarne Stroustrup, Addison Wesley Publishing Co., 1991; *C++ Inside & Out*, Bruce Eckel, Osborne McGraw-Hill, 1993.

Figure 7:
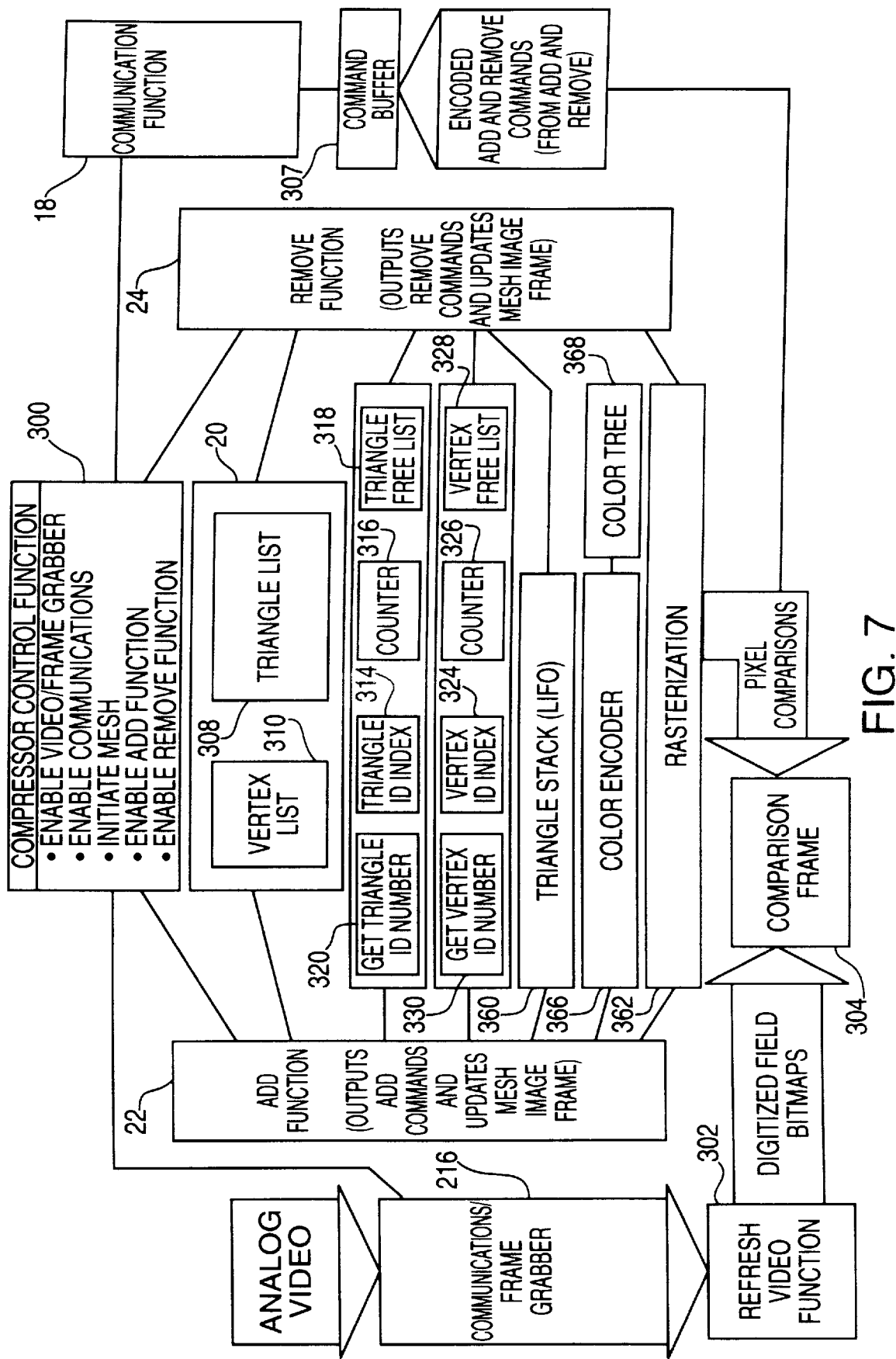
FIG. 7 Depicts an exemplary set of program elements for the compression function of the present invention.

FIG. 7 depicts an overview of the program elements and data structures used in an exemplary compression function 16 on the sending computer 10. A compression controller module 300 provides the basic set up and control for the compression function 16, it also creates data structures later used by the add and remove functions 22 and 24.

To obtain the video data, the compressor controller process 300 enables the frame grabber 216 by sending it a sequence of commands and parameters such as the picture size (in pixels) into which each video frame will be digitized, the frame rate for the sequence and the color depth of the pixel information. When in operation, the frame grabber 216 captures the analog video stream, digitizes it and outputs the field to a specific memory location also designated by the compression controller process 300. To manage the input of the video data, the present invention provides a refresh function 302 which updates a frame location in RAM which is used for comparisons against the mesh model data and is thus called—"the comparison frame" 304. The comparison frame 304 contains the most current bitmap information and is the source of bitmap information for updating and changing the mesh model 20. The refresh function 302 (once invoked by the compression controller module 300) continuously updates the comparison frame 304. In an exemplary embodiment in which the frame grabber 216 outputs fields every 1/60th of a second, the refresh function 302 accordingly updates the comparison frame 304 every 1/60th of a second. The comparison frame 304 holds pixel color assignments for one entire frame worth of pixels—i.e., two full fields. Each update by the refresh function 302 updates the pixel color assignments for one of the fields in that frame (odd or even).

In the exemplary embodiment, the frame grabber 216 digitizes incoming video to frames having a picture size such as 640×480 (i.e., two 320×480 fields) or larger with a 3 byte, 24-bit color depth. Thus, the current frame 304 must have memory to store at least a 640×480×24 bit matrix of pixel color assignments. In the exemplary embodiment, the compressor controller module 300 allocates the comparison frame 304 as a frame buffer with a stack of 24, 640×480×1 bit plane arrays, each array carrying for each pixel one bit of the pixel's 24 bit color assignment. Such an allocation by bit planes allows for speedier processing of the bitmap pixel data by the graphics processors.

To enable communications between the sending and receiving computers (10 and 12) the compressor controller module 300 enables the communications function 18 to establish a communication link with the receiving computer 12 following a communication protocol. For an embodiment using a telecommunications based system, like the Internet (as the communication system 26), the communication function performs the steps of encapsulating the data and sending through standard TCP/IP layers to reach the destination computer over the network.

In addition to enabling procedures for video input and communications output, the compression controller module 300 also initiates some basic data structures used in the compression process. One important data structure is the mesh model 20 (i.e., the triangulation). In the exemplary embodiment, the mesh model 20 comprises two basic data structures: a triangle list 308 and a vertex list 310.

The triangle list 308 provides a central repository of information concerning each triangle in the interconnected set of faces that make up the image model. The triangle list 308 contains a linked list of mesh face (triangle) records. Each triangle record contains the information about the mesh's topology: it identifies the vertices of that triangle and provides other information such as references to the triangle's neighbors.

The information for the triangles is accessed through index references and flags which indicate special characteristics of the triangles. The indices provide pointers or index references to items describing the triangle's properties such as the coordinates of vertices, colors of the vertices and the triangle's neighbors. In addition, a triangle link in the mesh data structure contains flags which indicate status and other characteristics of a triangle such as whether the triangle has been newly altered (e.g., by a point insert). In an exemplary embodiment, a record of the triangle list 308 can be represented by:

| | |
|---|---|
| NEIGHBORS: | Neighbor #0, Neighbor #1, Neighbor #2 (Array of 3 pointers to other TRIANGLE records) |
| VERTICES: | Vertex #0, Vertex #1, Vertex #2 (Array of 3 pointers containing index locations which reference VERTEX records on the vertex list 310) |
| FLAGS | Indicators such as a flag that shows when the face record has been "freshly altered." |
| FACE INDEX | ID of the face record. |

The data element NEIGHBORS contains an array of pointers which reference other triangle records. Each of the triangle's neighbors share a common edge with the triangle in question. The data element VERTICES is an array of index ID's each of which references a specific data point on the vertex list 310. (The vertex list is described below).

The system stores neighbor and vertex data in a manner organized according to the teachings of the present invention. In an exemplary embodiment, as shown by the triangle in FIG. 8, the compression function orders the points of a triangle in a counterclockwise sequence, 0, 1 and 2. It is understood that the vertices could also be numbered in clockwise order or ordered by another fixed ordering system. The compression function orders the neighboring triangles in the same counterclockwise order to relate them to the vertices. Neighbor #0 is directly opposite vertex 0. Neighbor #1 is directly opposite vertex #1. Neighbor #2 is directly opposite vertex #2. As is described below, the present invention provides a system to maintain this ordering while maintaining an optimal construction for the mesh triangles.

Figure 8:
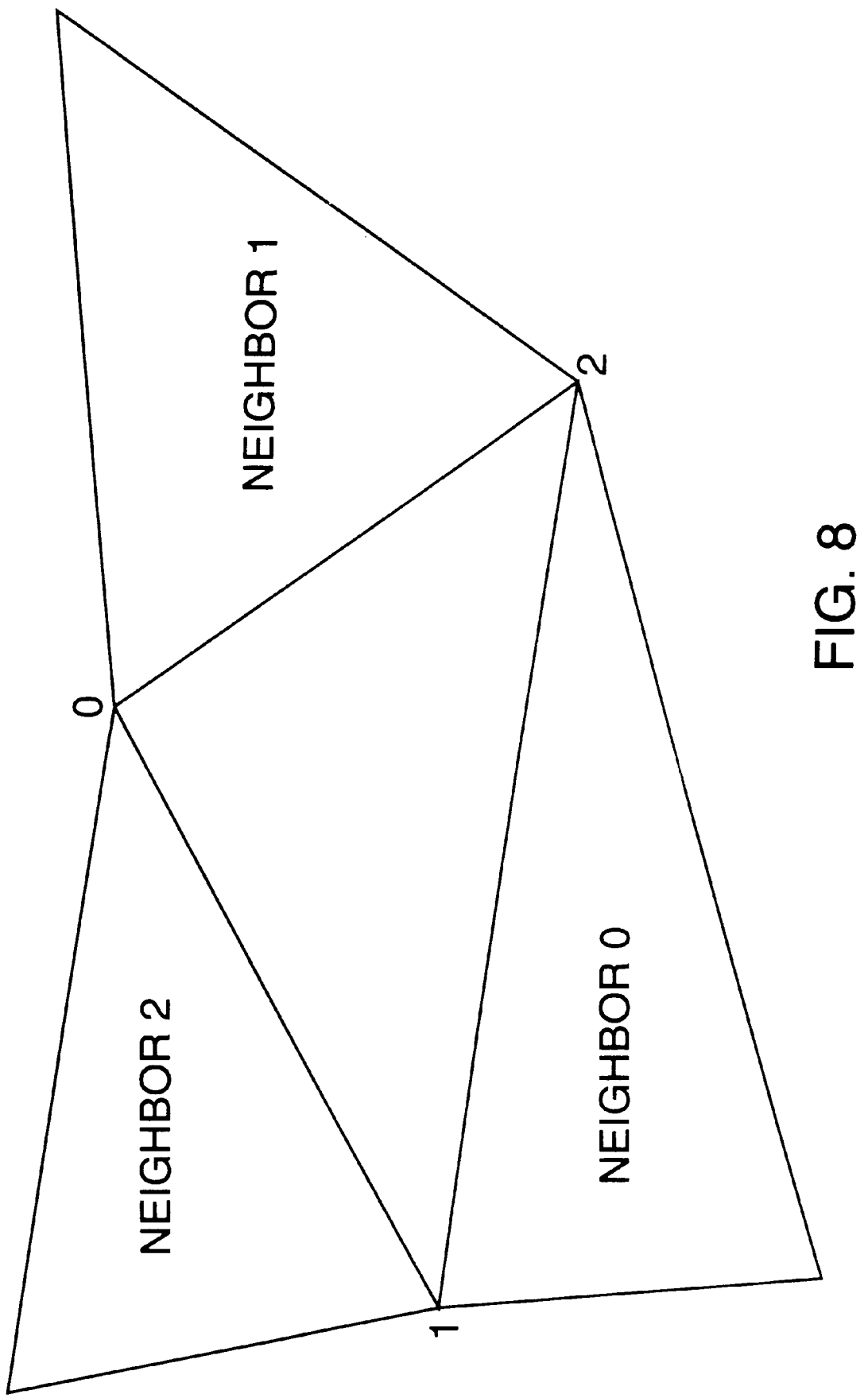
FIG. 8 Depicts an exemplary mesh triangle and an exemplary ordering of its points and neighbors according to the system and method of the present invention.
Figure 9B:
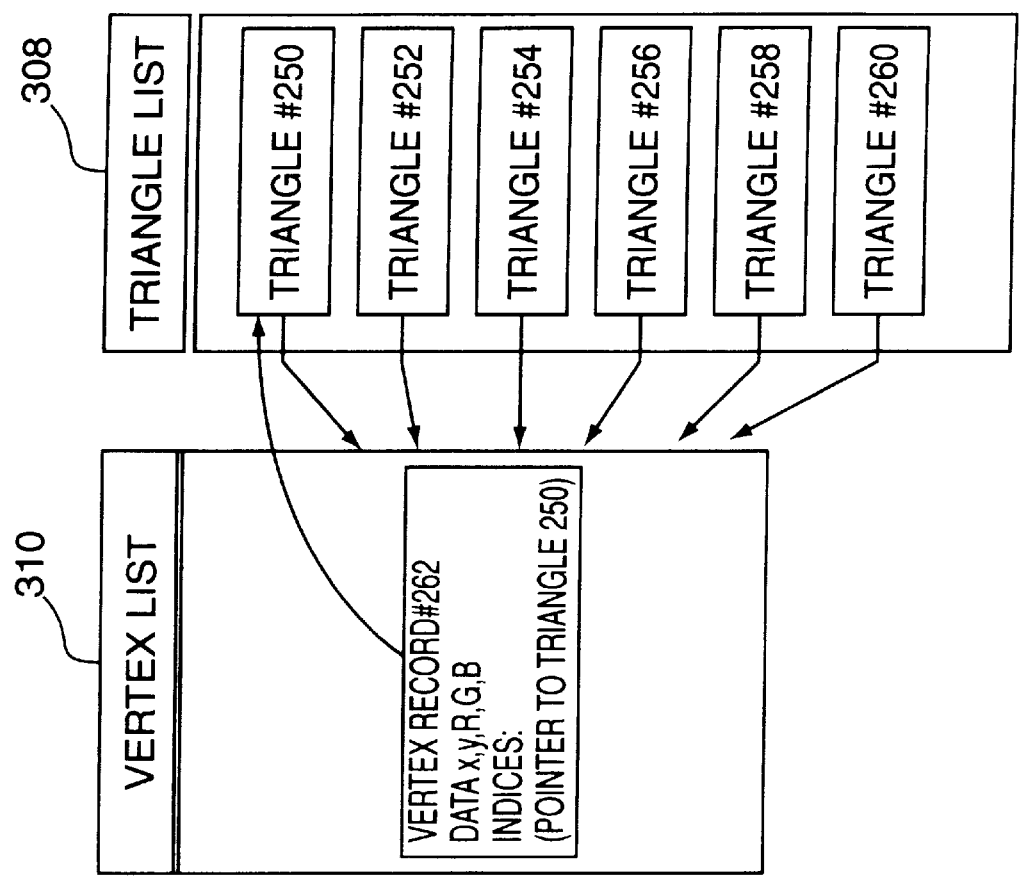
FIG. 9b Depicts a vertex list and triangle list construction of the present invention and shows exemplary pointer relationships which link triangles to vertices.
Figure 9A:
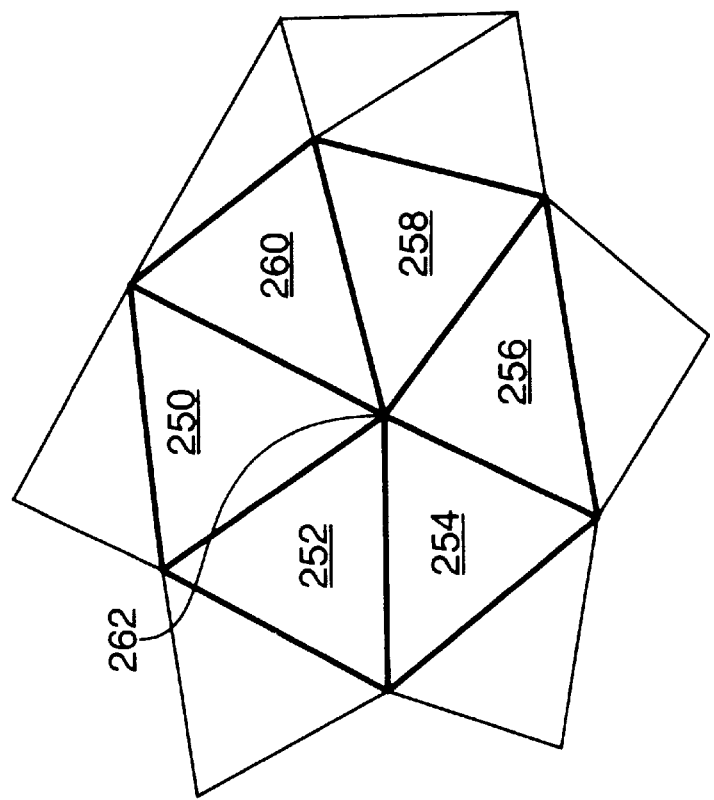
FIG. 9a Depicts an exemplary mesh configuration showing a vertex that is shared by many related triangles.

Referring again to FIG. 7, the vertex list 310 contains the x, y spatial locations and the R, G, B color locations for each pixel inserted into the mesh model 20. Each vertex slot in a triangle record described above contains a pointer which references one of the 5D (x, y, R, G, B) values on this vertex list 310. When the add function 22 inserts a point into the mesh model 20, it will write the point's specific x, y spatial and R, G, B color information to a record on the vertex list 310 and create corresponding triangle records which reference that point as described above. While a triangle can only have 3 neighbors as shown in FIG. 8, a vertex can be shared with many triangles. FIG. 9a shows six triangles (250, 252, 254, 256, 258 and 260) which share vertex #262. As shown in FIG. 9b, the triangle records in the triangle list 308 for each of these triangles (250–260) would contain pointer reference to a record for vertex #262 on the vertex list 310. In addition, the record for vertex #262 on the vertex list 310 also contains an index pointer which references back to one triangle record (e.g., the record for triangle 250). Through that single reference it is possible to locate the other triangles which also use this vertex. In addition, a vertex entry in the vertex list 310 may contain a number of flags (such as a flag indicating whether the point is "bad" (i.e., deleted from the mesh) or "good". In an exemplary embodiment, a record in the vertex list 310 could be arranged as follows:

| | |
|---|---|
| RECORD: VERTEX | (INDEX NO._____) |
| LOCATION: | x, y pixel location |
| COLOR: | R, G, B value |
| INDICES: | Pointer to one of the triangles which includes this vertex |
| FLAGS: | Good or bad flag |

In addition to providing the data structures for the triangular faces and data points of the mesh model (triangulation) 20, the present invention further provides data structures to revise existing triangle records and vertex records data structure when the processor deletes a point or mesh face. The indexing permits easy retrieval of the triangle and vertex records and permits the records to be revised. In addition, the indexing system permits the system to transmit compact ADD and REMOVE commands to the receiving computer 12 using index numbers rather than full point and triangle data.

For the triangle indexing system, the compression control module 300 allocates a triangle index 314—an array sized to the number of triangles the system would expect to be included in the mesh model 20 at its most dense instant (e.g., array size=5000). There is also a counter 316 (initially set to 0) and a triangle free list 318 which is a FIFO stack with a pointer initially indicating that the stack is empty. When the add function 22 creates a triangle, the process will obtain an index number for the new triangle. A get triangle ID number function 320 returns an available number that will identify the new triangle record. Free list numbers have been previously assigned. When a triangle is deleted from the mesh (i.e., during point removal) the remove function (as described below) "frees" this number by placing it onto the triangle free face list 318. The get triangle ID number function 320 first checks the triangle free list 318 for a free ID number before creating a new ID number. If the free list 318 is empty, the get triangle ID number function 320 uses the counter 316 to create the new ID number. The get triangle ID number function 320 sets the ID number to be equal to the current counter number, increments the counter (for later use) and returns to the add function the counter value as the ID number. The add function 22 then places a pointer reference to the new triangle record in the slot of the triangle ID index 314 which corresponds to the ID number.

Like triangle records, vertex records on the vertex list 310 also have a unique index numbers. When a point is inserted into the mesh, the add function 22 obtains a unique index number for that point. A get vertex ID number function 330 operates in a manner similar to the get triangle ID number function 320. The get vertex ID number function 330 first looks to a vertex free list 328 (a FIFO stack with pointer) to locate a free ID number. If the stack is empty, the vertex face ID number function 330 sets the vertex ID number to the current value of a vertex counter 326, increments the vertex counter (for the next operation) and returns the vertex ID to the add function 22. The add function 22 then inserts a pointer reference to the vertex record at the slot location in the vertex ID index 324 which corresponds to the ID number. The vertex record will also contain an index reference to this slot.

In addition to the data structures used for representing the mesh model 20, compression controller module 300 also establishes data structures for making color comparisons when adding and deleting points. One basic structure for color comparisons is the triangle stack 360—which orders the sequence of triangles for their rasterization and comparison against incoming video frames. In the exemplary embodiment, the triangle stack 360 has a LIFO stack structure so that when a mesh face is altered, such as by a point removal or a point insertion, the processor will remove the reference from wherever it occurs on the stack and then replaces a reference to the triangle on the top of the stack. The triangle stack 360 in the exemplary embodiment will contain a pointer reference to each triangle in the mesh structure and the top of the stack will contain the most recently active triangles.

As stated above, both the add and remove functions continually compare the pixel point color values from the incoming video frames against color values for the corresponding pixels which would be generated using color information from the vertices of one of the mesh model's triangles. For each triangle rasterized, the selection procedure seeks to add, at the earliest stage, pixel point values which are the most significant in updating the shape and color details of the image. In the rasterization process, the processor will pop a mesh triangle from the triangle stack 360 rasterize it to create a R, G, B value for points within the triangle and compare each value to a corresponding pixel value from the comparison frame 304. The processor will compare the difference between the comparison frame 304 bitmap pixel and calculated value. For each set of pixels compared during rasterization, the processor computes a difference value. The bitmap point with the largest difference value is the most significant point and if the difference is greater than a threshold, the processor inserts the point into the mesh.

To provide control for the point adding and removal processes, the present invention permits the user at the outset to set tolerance values as to when a point should be added to the mesh. One tolerance value in the present invention relates to the calculated distance value. When such a tolerance is used the add function 22 will only add points to the mesh if their distance value is greater than the preset tolerance.

In addition to the program elements and data structure used for constructing and maintaining the triangulation, the compression function 16 also includes processes to encode the ADD and REMOVE commands to construct more compact representation of each command before it is sent to the receiving computer 12. For example, a REMOVE command can be encoded by using a vertex ID for the point to be removed. Thus, rather than transmitting a command of:

| "REMOVE" | x, y | R G B" |
|---|---|---|
| (one bit) | (4–6 bytes) | (3 bytes) |

The process can encode the command:

| R | Vertex ID No. |
|---|---|
| (one bit) | (2 bytes) |

In addition, a color encoding process 366 seeks to compact bytes of color information (which would otherwise have to be transmitted in ADD commands) by creating, on-the-fly, a binary tree structure—a color encoding tree 368. The color encoding tree 368 stores RGB color assignments which have been found in past frames. When possible in subsequent add procedures, the color encoding process 366 will replace the RGB assignment for a point to be added with the location code for that color when it is located in the color tree. Because color assignments often repeat for pixels throughout the transmission process, the color encoder function 366 can quickly fill the color tree with set color values which are used over and over when generating ADD commands. Most colors listed on the color encoding tree 368 can be represented by codes that are much smaller than the full, 3 byte (24 bit) number that make up an RGB color assignment. As the computer processes ADD commands, it continues to build the tree grouping the colors in branches (and adjusting the tree as it grows) according to inertia tensor properties. The color encoding process 366 and the color encoding tree 368 are discussed in further detail below.

System Process Flow

This section presents a set of exemplary process flows for the add and remove functions (22 and 24), the compression controller module 300 and the rasterization function 362. As stated above, the process controller module 300 enables the video input and communication functions, creates the initial mesh (the initial mesh and related data structure) (see FIG. 3) and controls the add and remove functions (22 and 24). In implementation it is noted that the add and remove functions (22 and 24) can be implemented either as multi-threaded (asynchronous) or serial functions. The exemplary embodiment presented is a serial implementation. A serial implementation permits enhanced organization and stream-lining of the add and removal processes. Sequential use of the removal process first then an add process ensures that the full image is completely updated with the fewest possible point additions or point removals.

Figure 10A:
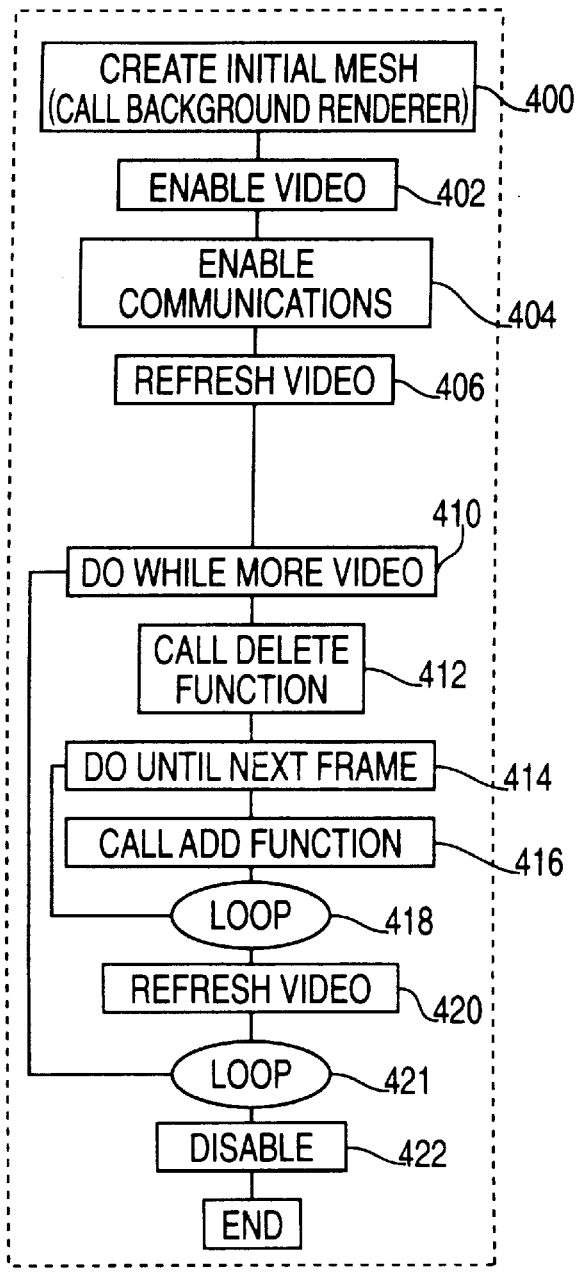
FIG. 10a Depicts an exemplary process flow for the compression controller function of the present invention.
Figure 10B:
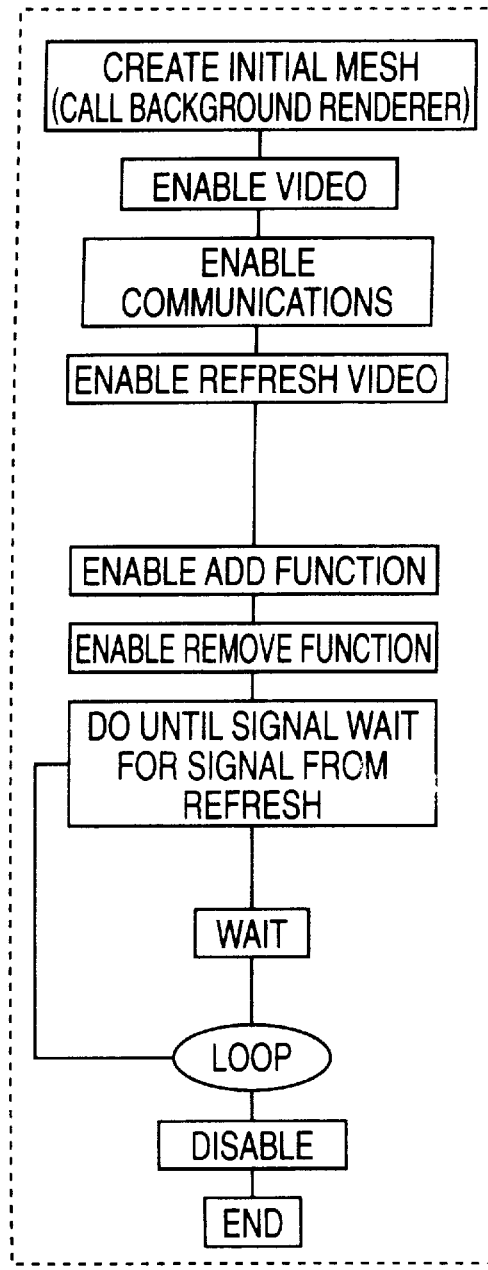
FIG. 10b Depicts an alternative process flow for the compression controller function of the present invention.

FIG. 10a depicts an exemplary process flow of the compression controller module 300 implementing the add and remove functions (22 and 24) as a serial process. In step 400, the CPU 202 initiates the mesh data structure described above, e.g., sets up the initial mesh of FIG. 3 and, in step 402, the CPU 202 enables the frame grabber 216 to capture video and in step 404 enables the communications function 18. In step 406, the CPU 202 next enables the refresh video function 302 as a parallel process to obtain the first video field and update the comparison frame 304 with additional fields every 1/60th of a second.

In step 410, the CPU 202 begins a processing loop to: (i) delete points from the mesh which no longer are current; (ii) add new points from the comparison frame 304 to update the mesh; and (iii) refresh the comparison frame 304 in preparation for the next sequence. In step 412 the CPU 202 calls the remove function 24. The remove function 24 (as serially configured) checks all vertices in the mesh, removes those points that are no longer valid and changes the mesh triangles accordingly. After the removal, the CPU 202 begins a processing loop (in step 414) to make repeated calls to the add function 22. The loop is set to call add until it is time to retrieve the next field or until the "distance" value for any triangle is less than the user set tolerance. The add function 22 in such an embodiment inserts only one point for each call in step 416. The control loop continues this process (looping in step 418) until the next video frame is due. In step 420, the CPU 202 again calls the refresh video function 302 to update the comparison frame 304 and then loops in step 421 to step 410 to proceed until no more video fields remain.

Add Function Process

Following the initial set up routine, the add function 22 performs the processes of updating the mesh model 20 at the sending computer 10 and transmitting ADD commands for each point insertion to the receiving computer 12. One aspect of the add function is the rasterization process which as stated above generates a set of R, G, B values using the R, G, B values of the mesh triangles for comparison against the values found in the same locations in the comparison frame.

Figure 11:
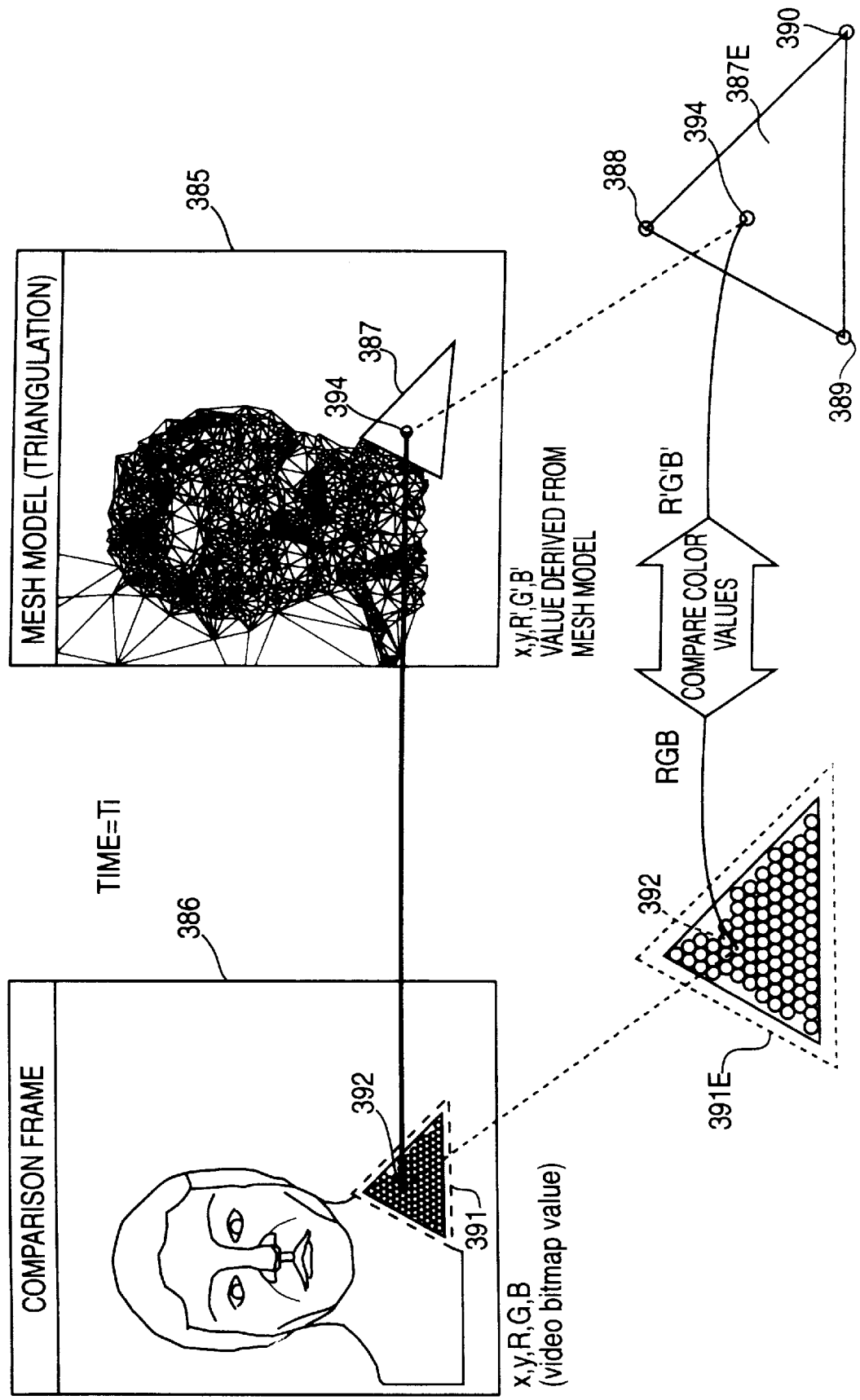
FIG. 11 Depicts the relationship between a triangle in the mesh model of the present invention and a bitmap pixel point in a frame or field of incoming digitized video.

FIG. 11 depicts an example of the rasterization function 362. At a given time $T_i$, the mesh model 20 (i.e., the triangulation) has the appearance shown in 385. At the same time, the comparison frame 304 contains a set of pixel assignments for a video image as shown at 386. Mesh model 385 contains a number of triangles, including triangle 387 which has been enlarged at 387E. That triangle is defined by the points 388, 389 and 390. The x, y values of those pixel points correspond directly to similar x, y locations in the comparison frame 386 at triangular location 391 (also enlarged at 391E) which bounds a number of pixels. For area bounded by triangle 387 in the mesh model, rasterization function 362 computes R, G, B color assignments for each value for the mesh (such as the R, G, B color values computed for point 394). The processor then compares the color information of the pixel values of the computed pixels against the color values generated at the corresponding location in the comparison frame. For example, in FIG. 11 the rasterization function 362 compares the RGB color values of pixel point 392 against the RGB color values computed for a point at a corresponding location in the mesh triangle (e.g., point 394). For each triangle the rasterization process will return to the add function, the pixel from the comparison frame which differs most from its rasterization counterpart. If the difference is greater than a threshold, then the add function will insert the point.

Figure 12:
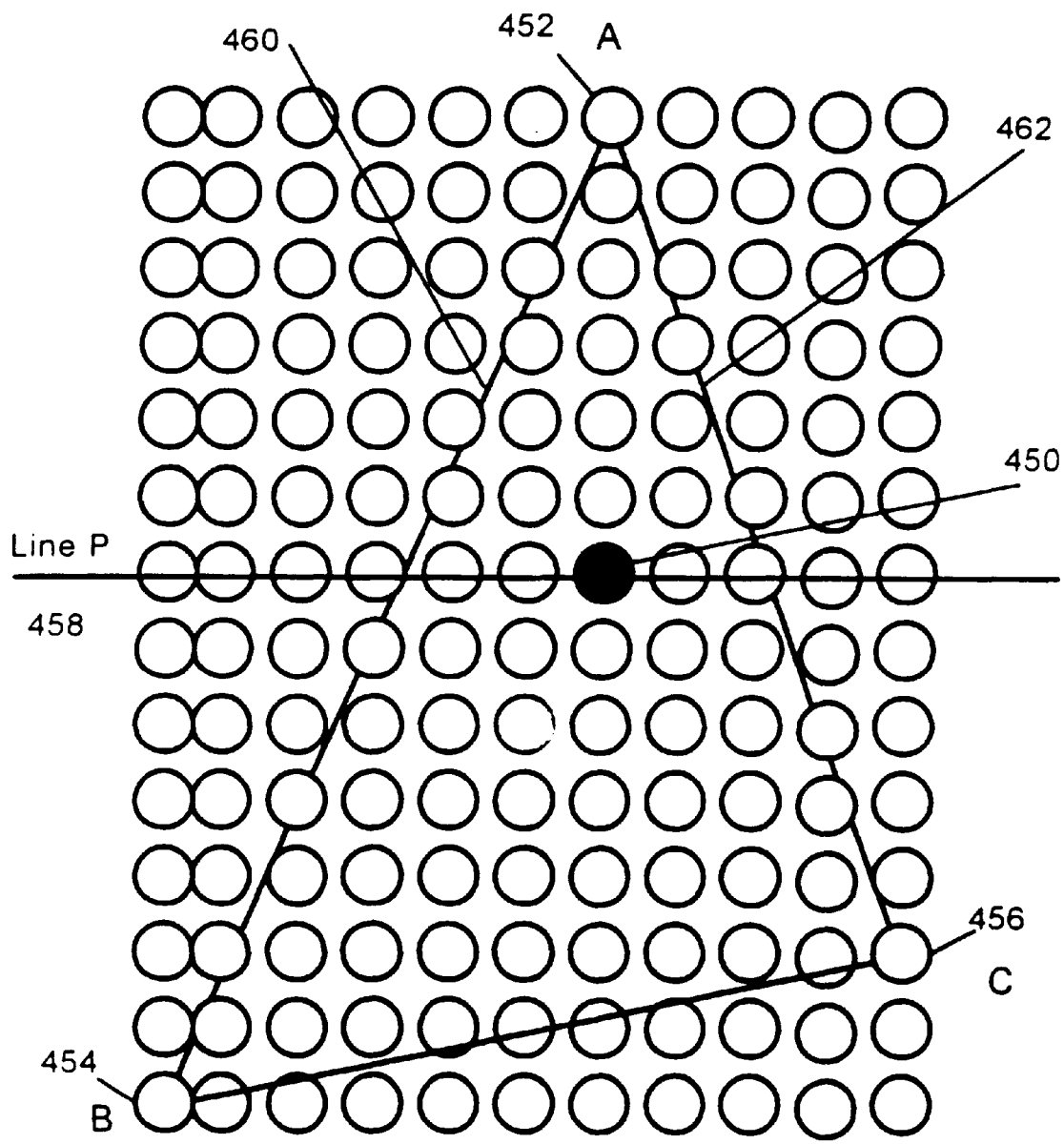
FIG. 12 Depicts a pixel whose color values will be rasterized according to the present invention.

The rasterization process creates R, G, B coordinates by interpolation. FIG. 12 depicts an exemplary pixel 450 from an area in a texture map file which is limited to a mesh triangle and shows how the processor can determine R, G, B values for the pixel. Pixel 450 is bounded by vertices of a triangle having known R, G, B values: i.e., point A (point 452); B (point 454); and C (point 456). Pixel point 450 falls along a scan line of pixels, identified as line P 458. Line P 458 intersects two edges of the triangle edge AB 460 and edge AC 462. The processor can determine equations for edges AB 460 and AC 462 and correspondingly, an equation for line P 458 based on intersections with the AB/AC edges. From those determinations, the processor can calculate R, G, B values for pixel 450.

Figure 13:
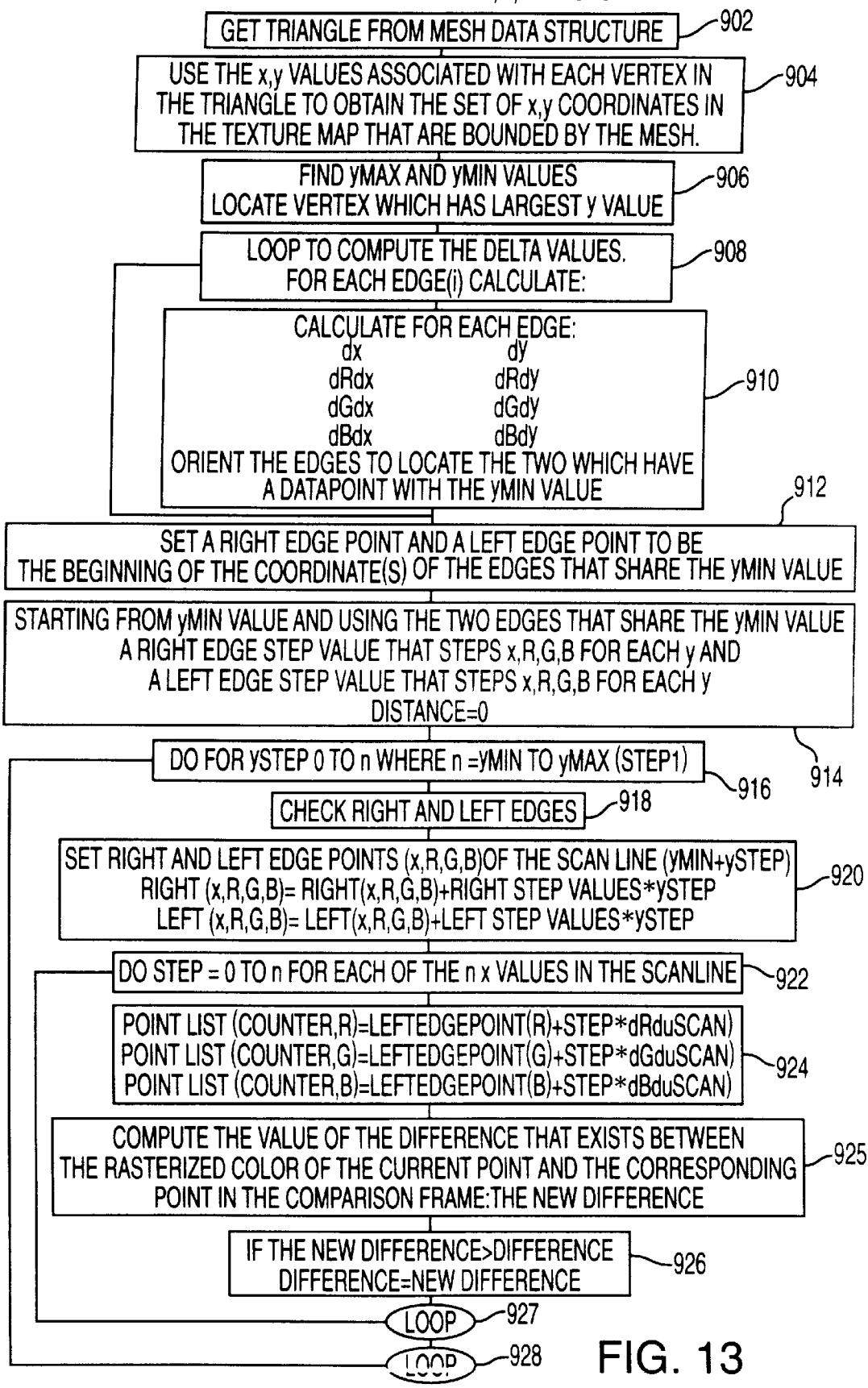
FIG. 13 Depicts an exemplary rasterization process of the present invention.

FIG. 13 depicts an exemplary process flow for generating R, G, B points for a triangle according to a rasterization process. The process of FIG. 13 generates a full set of R, G, B values from the available R, G, B data found in the mesh triangle data points. In step 902, the processor begins to rasterize R, G, B coordinate values for the associated texture map pixels with a mesh triangle. The processor accesses the triangle information from the initial mesh data structure.

In step 904, the processor locates the x, y links that each vertex in the mesh triangle has as a reference to a corresponding point comparison frame.

In step 906, the processor determines from the x, y coordinate values the minimum and maximum coordinates x and y values for the three triangle vertices. As pixels are arranged in "scan line" rows corresponding to y, each y scan line will contain R, G, B coordinate values for each x. The rasterization process will loop through each y scan line creating R, G, B values for comparison against R, G, B values in the comparison frame. The MIN and MAX, x and y values are used for later processing.

In step 908, the processor loops to calculate, for each edge of the texture map triangle found by the three x, y coordinate values, the change in R, G, B for each change in the y value and the change in R, G, B for each change in the x value. For each edge, the processor in step 910, computes:

| dy | dx |
|---|---|
| dRdy | dRdx |
| dGdy | dGdx |
| dBdy | dBdx |

In this step, the processor also arranges the edges to identify the two edges that have the y MIN value. It is from that part of the triangle that the rasterization process will begin.

In step 912, the processor begins a set of processes to set the edge values between which the processor will compare the R, G, B values. For each y line of pixels, the processor will need to establish a right and left x position and a corresponding R, G, B value. As the y scan lines change the R, G, B values will change following the dy values. Along each scan line the R, G, B values will change along the dx values. In step 912, the processor sets the right and left edge points at the outset to be the shared endpoint of the edges (right and left) which share the yMIN value. Next, the processor proceeds to step 914 to establish a stepping factor for each of the variables based on the delta values, dRdy, dGdy, dBdy and dxdy for each scan line step through the pixel values.

In step 916, the processor begins a loop to process the pixels in the scan line. The loop processes each scan line from y MIN to y MAX. The first step is to begin a check on the edges which use the y MIN value to see if they have not run out. If either the right or left edge has run its length, and the y scan line is beyond it, the processor will swap the third edge with that edge.

In step 920, the processor establishes the boundary of right and left edges along the y scan line and the R, G, B values that are associated with it. The step uses the dy values to establish a left edge x point and a right edge y point and the associated R, G, B values. With the right and left edge of the scan line established, the processor can now generate an R, G, B value for the coordinate R, G, B value in the comparison frame.

There are functions available to generate point values along a scan line through rasterization. FIG. 13 presents a loop (steps 922–927) which processes R, G, B values for each x position moving from the left to the right along the scan line. For each x increment, the processor creates R, G, B values and then in step 926 the processor compares the R, G, B values of the bitmap pixel against the corresponding R, G, B values rasterized from the coordinates of the mesh triangle. The difference between the bitmap and rasterized R, G, B values can be measured by a function such as:

difference: $\sqrt{d_r^2 + d_g^2 + d_b^2}$ or difference: $L_R|d_R| + L_G|d_G| + L_B|d_B|$ or difference: $L_R|d_R|+L_G|d_G|+L_B|d_B|$ Where $d_R$, for example, denotes (e.g. for R) the difference in red coloring between the actual pixel and the rasterized approximation and where $L_R$, for example, denotes the luminescence value of the color red. In step 926, the process compares the value to the previous maximum. If the new difference value is greater, it becomes the maximum difference point.

In step 927, the processor loops to step 922 and continues processing X, Y, Z values for each x position in the current scan line. The processor loops in step 928 to step 916 to process another scan line until all triangles have been processed.

Figure 14:
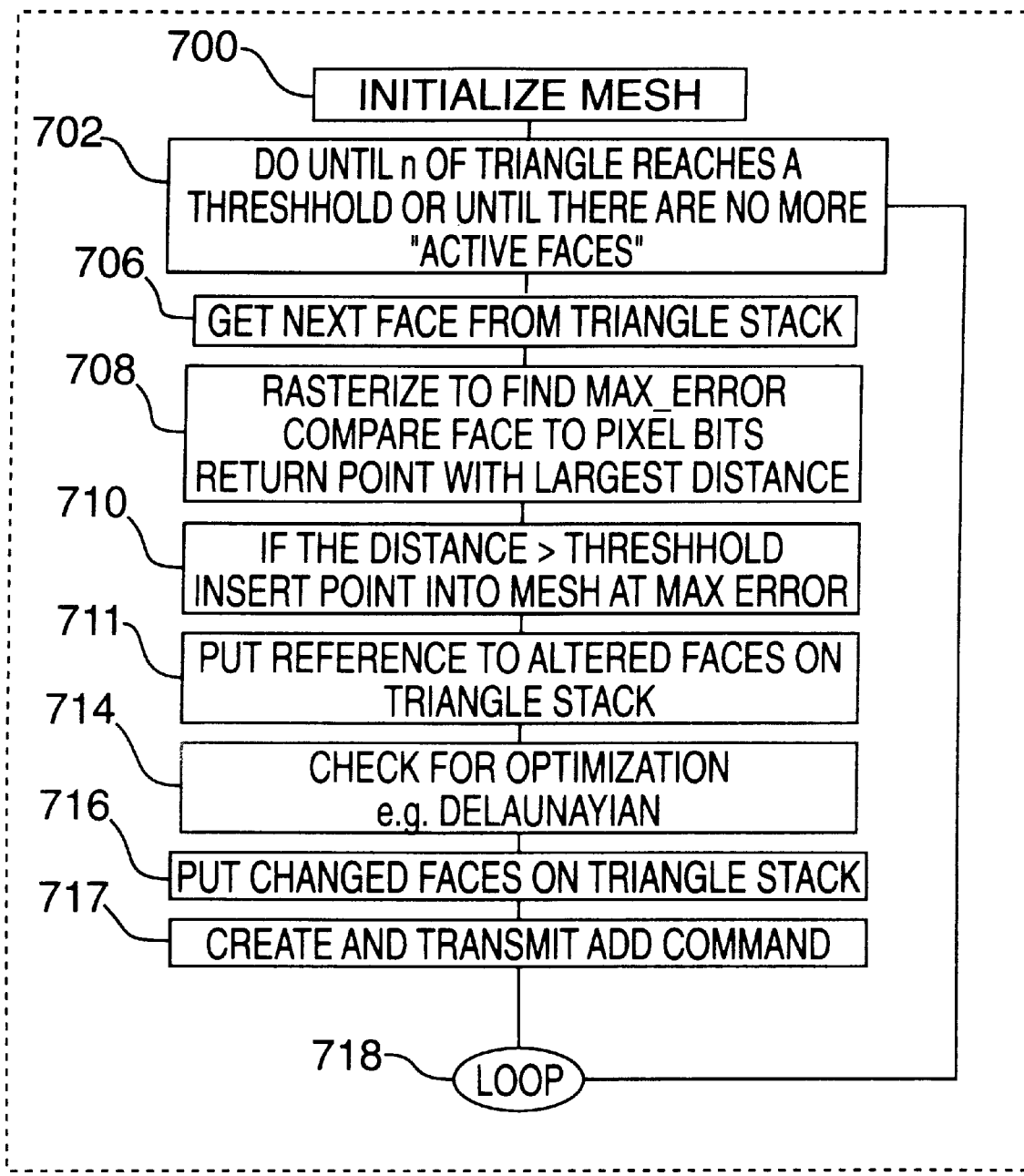
FIG. 14 Depicts an exemplary process flow for an add function of the present invention.

Using the rasterization process, the add function insert points. FIG. 14 depicts an exemplary add function algorithm. Although the presented add algorithm uses rasterization to compare the pixel values of the triangle against the color values which would be generated by the triangles geometric/color distance function or a normal distance function to determine points of significance. As can be seen above in reference to the rasterization process set forth above in FIG. 13, the rasterization process can generate color or other values interpolating them from the known values of triangle points.

Referring to FIG. 14, the processor in the add function creates an initial mesh in step 700 into which it will insert data points from the bitmap image to create the mesh. In the exemplary embodiment, the initial mesh will have a two triangle configuration made from four points which match or exceed the bounds of the image. (See FIG. 3) For example, if a bitmap image is of size 640×480 in dimension, the x, y coordinates of the initial mesh will be sized to contain that image. The four selected points will create a flat, rectangular plane consisting of two triangles. For each of the initial four points of the plane mesh, the processor will also select R, G, B coordinates for the initial mesh data points so that the mesh has an initial color which will serve as the point of comparison when determining whether to add R, G, B values from the bitmap image.

In step 702, the processor begins a loop to incrementally insert bitmap data points from the comparison frame into the mesh. In step 702, the processor begins a loop in which it adds points into a mesh until a threshold reaches maximum or until there are no more active faces. For example, the processor may insert points until the comparison distance between any bitmap pixel point and its counterpart in the mesh falls below a given threshold, the "comparison distance" being the distance between the colors of the pixels of the bitmap image and the area of the mesh triangle which corresponds to that pixel.

In step 706, the processor gets the next triangle from the triangle stack. In the rasterization step 708, as described above, the process compares each pixel value in the bitmap with a corresponding rasterized value until the processor finds the pixel with the largest distance value for that triangle. In step 710, the processor will compare that distance value returned from the rasterization function against a threshold. If the distance is larger than the threshold, the processor inserts the bitmap data point into the mesh triangle using the process described below. The insertion of the new point alters the mesh face into which a bitmap point was inserted. The insertion also creates two new faces. The process in step 711 places references to each altered face on the top of the triangle stack. The triangle stack's FIFO structure allows faces where there have been substantial insertion activity to be processed first. After the point insertion, the processor proceeds to step 714 to check the mesh structure for optimal construction using, e.g., Delaunayian checking routines as described below. For each flip made during the checking procedure, the processor in step 716 places an indication for each changed face on the triangle stack. At the end of the add process, the system will also output an add command in step 717.

In step 718, the processor loops to step 702 where it will process each face inserted on the recalculation list stack. The process continues until the process has inserted the desired number of points or until the resolution of the mesh has increased until the distance between any bitmap data point and its rasterized mesh counterpart does not surpass a set threshold.

Figure 15:
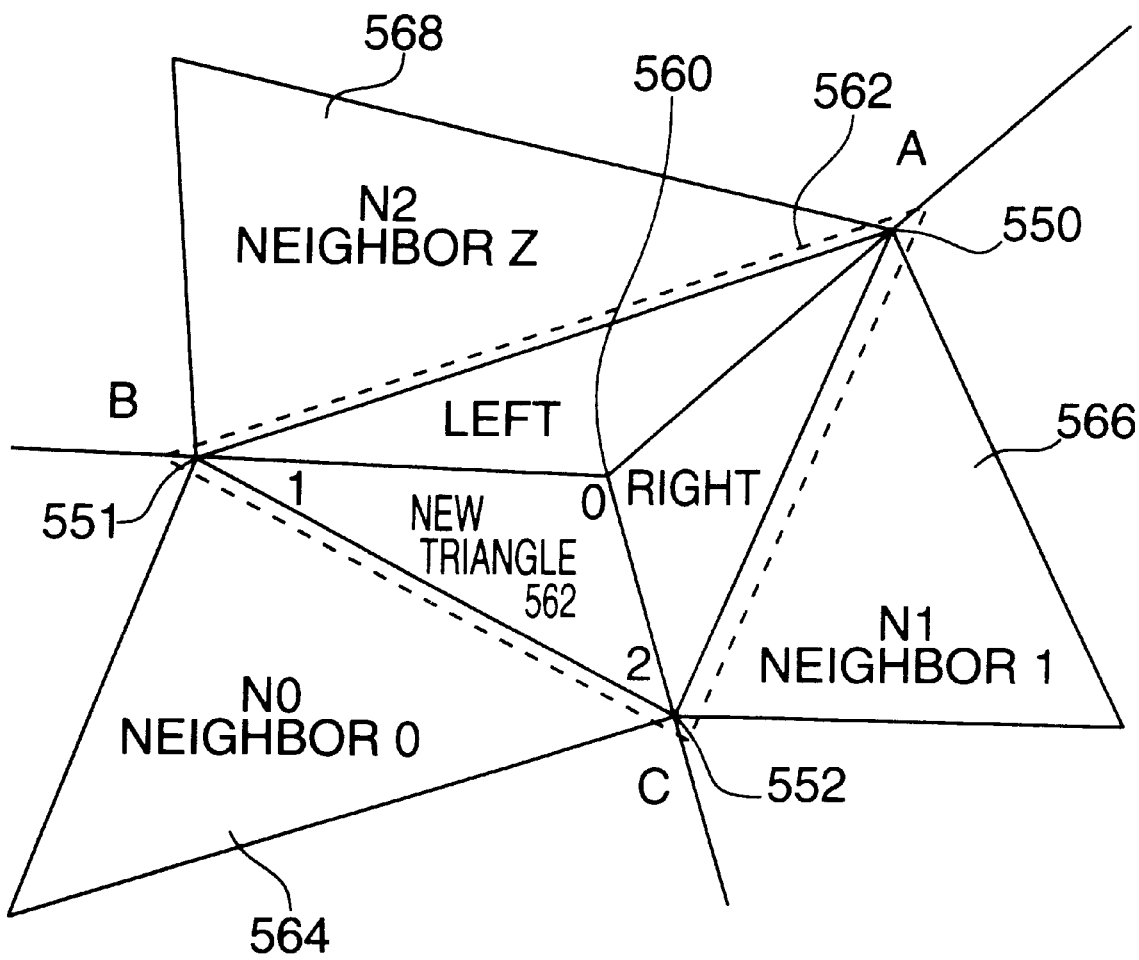
FIG. 15 Depicts the insertion of a point into a mesh triangle.

In step 710, the CPU 202 inserted the point into the mesh model 20. Inserting the point creates a number of new faces and requires a number of adjustments to the mesh. FIG. 15 depicts an addition of point 560 to triangular face 562 ("INITIAL TRIANGLE") and shows the alteration of the face, vertices and neighbor relationships that the addition requires. Before the addition of point 560, triangle 562 with vertex points A, B and C (points 550, 551 and 552 ordered counterclockwise) carried the following relationships in its triangle record:

| Record: "INITIAL TRIANGLE" (Triangle ID #562) | |
|---|---|
| NEIGHBORS: | Neighbor 0 (Triangle 564), Neighbor 1 (Triangle 566), Neighbor 2 (Triangle 568) |
| VERTICES: | V0(point 550), V1 (point 551), V2 (point 552) |

Adding point 560 requires changes to the data structure links. The addition creates two additional faces: a RIGHT face (with vertices 560, 550, 552) and a LEFT face (with vertices 560, 550 and 551). The addition also alters triangle 562; it becomes NEW TRIANGLE 562.

New triangle 562 no longer has as its Vertex 0 at point 550. The processor sets Vertex 0 for triangle 562 to point 560. The CPU 202 also makes corresponding adjustments to the indices on the vertex list 310. The new, smaller triangle has as vertices points 560, 551 and 552. The links to Neighbor 1 (triangle 566) and Neighbor 2 (triangle 568) also must be changed, because these triangles are no longer neighbors of new triangle 562. The process will first change new triangle 562's neighbor link 2 from "Neighbor 2" to "LEFT". The processor will also change new triangle 562's Neighbor 1 link from "Neighbor 1" to "RIGHT." The data structure for the revised new triangle 562 will include the references as follows:

| Record: "NEW TRIANGLE" (Triangle ID #562) | |
| --- | --- |
| NEIGHBORS: | Neighbor 0, RIGHT, LEFT |
| VERTICES: | V0 (new point 560), V1 (point 551), V2 (point 552) |

The processor creates new face records, RIGHT and LEFT, with references as follows:

| Record: "RIGHT"(Triangle ID #___ ) | |
| --- | --- |
| NEIGHBORS: | Neighbor 1, LEFT, NEW TRIANGLE |
| VERTICES: | V0 (new point 560), V1 (point 552), V2 (point 550) |

| Record: "LEFT"(Triangle ID #___ ) | |
| --- | --- |
| NEIGHBORS: | Neighbor 2, NEW TRIANGLE, RIGHT |
| VERTICES: | V0 (new point 560), V1 (point 550), V2 (point 551) |

To create these additional faces, the CPU 202 allocates the additional face records and then obtains unique triangle ID numbers for these triangles using the get triangle ID function 320. The process loads pointers into the vertex slots which reference the actual point data on the vertex list 310. The CPU 202 also creates corresponding links to the triangle on the indices at the vertex list for these vertices.

The CPU 202 also replaces Neighbor 1 (triangle 566)'s neighbor link to (old) triangle 562 with a link to RIGHT. The CPU 202 finds the link to (old) triangle 562 by searching each of NEIGHBOR 1's neighbor links until it finds the one that points to that triangle. The processor replaces Neighbor 2 (triangle 568)'s neighbor link to (old) triangle 562 with a link to LEFT in the same manner. Finally, for each of the adjusted triangles, the processor creates a reference which indicates use, e.g., a time stamp, how new the point insertion is.

In addition, the point addition may require some other adjustments. The point has been inserted into the mesh, but before the add process is complete the new mesh configuration must be checked to determine whether the new configuration has an optimal structure. In the exemplary embodiment, the invention maintains optimality following Delaunayian principles.

Delaunay principles hold that a circumcircle described by the three vertices of the triangle must not contain any other points of the mesh. When a triangle does not conform to this principle, it is not optimal and requires reconfiguration. In such a case, Delaunay principles hold that the edge that exists between the triangle examined and the triangle which contains the extra point must be "flipped" to create a new edge between those two triangles. In the new configuration created after point insertion, it may be necessary to make many flips while checking the resulting triangles for optimality.

Pending U.S. patent application Ser. No. 08/730,980 and pending U.S. patent application No. 08/730,979, both referenced above, describe systems and methods for Delaunayian optimality checking and flipping procedures which are incorporated by reference herein and suitable for the checking and flipping procedures of the present invention.

Figure 16A:
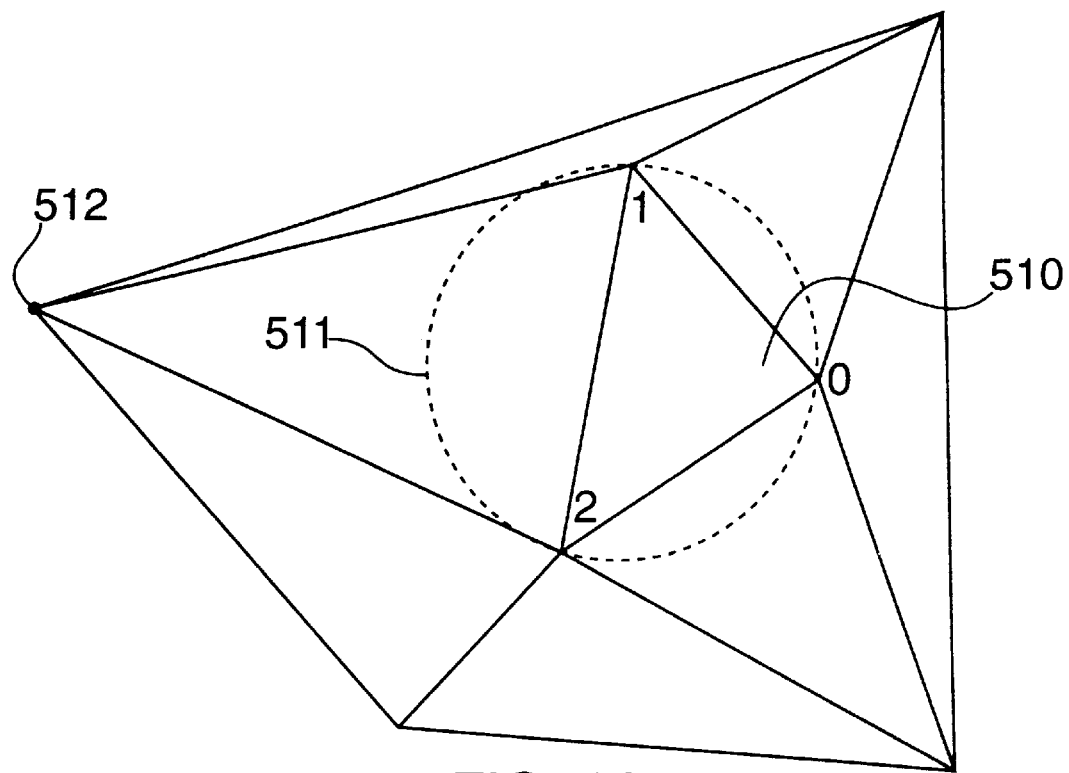
FIGS. 16a–b Depict basic principles of Delaunay optimization using a circumcircle.
Figure 16B:
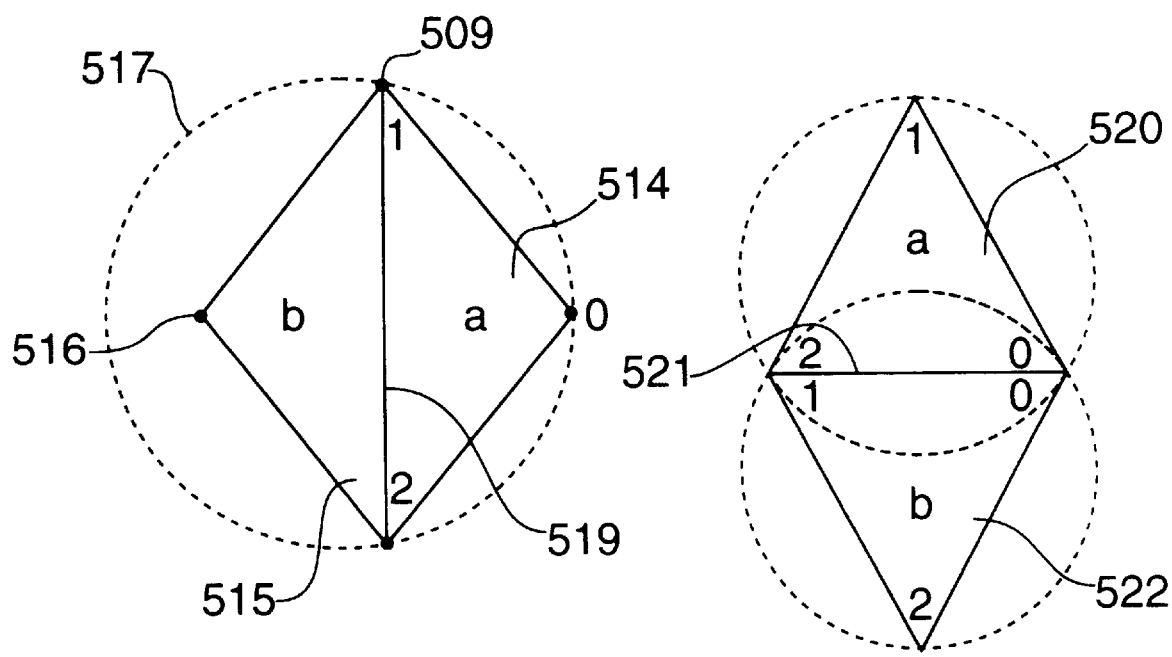

FIGS. 16a–b depicts the basic optimization principle of Delaunay triangulation as implemented in the present invention. To implement a Delaunay triangulation check the present invention uses the spatial x, y values such that the calculations are performed on a planar surface. For a triangle, e.g., triangle 510 in FIG. 16a, Delaunay principles hold that a circumcircle described by the three vertices of the triangle will not contain any other points of the mesh. In FIG. 16a, circumcircle 511 circumscribes no other point, such as point 512. Hence, triangle 510 is optimal by Delaunay principles.

FIG. 16b, on the other hand, depicts a triangle configuration (between triangle 514 and 515) that is not optimal and requires "flipping." As shown, circumcircle 517 for triangle 514 bounds point 516. In such a case, Delaunay principles hold that edge 519 must be flipped to create new edge 521 (as shown) and two new triangles 520 and 522. In creating the new configuration after point insertion, it may be necessary to make many flips while checking the resulting triangles for optimality. The present invention speeds the flipping process by creating a predetermined order to the checking and flipping.

Referring again to FIG. 14, the add function 22 executes at step 714 a procedure to check all triangles in the region of the insertion point for optimality. The basic procedure of this step is to check the triangles in the region to determine whether they should be flipped. For each triangle tested, the processor in step 716 makes a call to a flip function which tests a triangle and a given neighbor, executes a flip if necessary and returns a yes/no flag showing whether it executed a flip.

Figure 17:
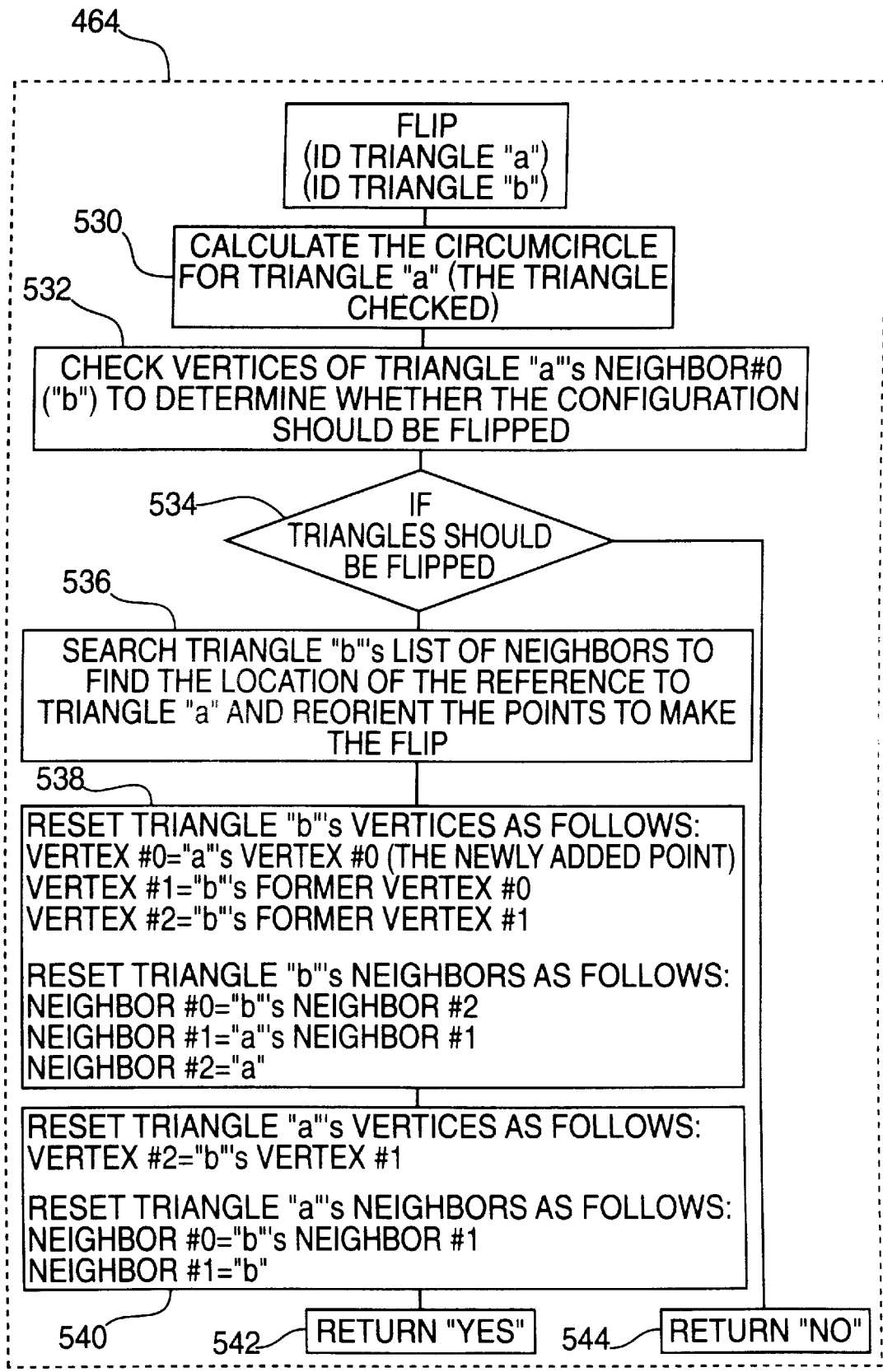
FIG. 17 Depicts an exemplary process flow for a "flip" procedure according to the present invention.

FIG. 17 depicts an exemplary process flow for exchanging a link for two triangles when a flip might occur. This is the execution of the flip function 464. In this discussion, reference is also made again to FIG. 16b which shows exchange of links in the mesh as the flip occurs. Referring to FIG. 16b, the procedure operates to check triangle "a", 514. Neighbor #0 of triangle "a" is triangle "b", 515.

Referring to the procedure of FIG. 17, the processor in step 530 calculates a circumcircle (e.g., 517, FIG. 16b) for the triangle in question, e.g., Triangle "a". In an exemplary embodiment, the system calculates and stores the circumcircle equation for use in later checking procedures. This circumcircle equation can be reused until the triangle is altered by a point insertion or flipping. The storage of the equation provides additional processing speed. In step 532 of FIG. 17, the CPU 202 checks to insure that the vertices of Neighbor 0 (Triangle "b") do not fall within the bounds of circumcircle 517 (FIG. 16b). If the circumcircle has no point within its boundary the flip function 464 in step 544 returns a no flip indicator. If points do fall within the circumcircle, the processor in step 534 determines that the edges of the triangles must be flipped.

Figure 16C:
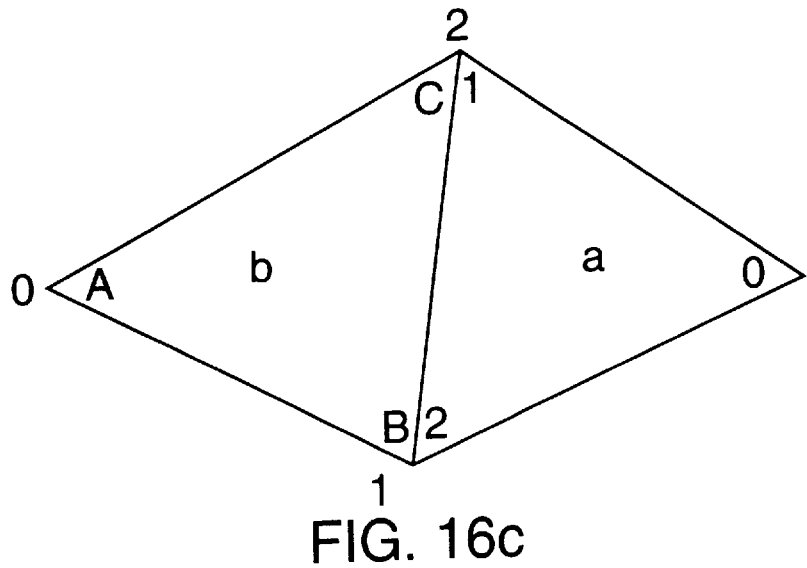
FIGS. 16c–e Depict different vertex alignments for the triangles according to the present invention.
Figure 16D:
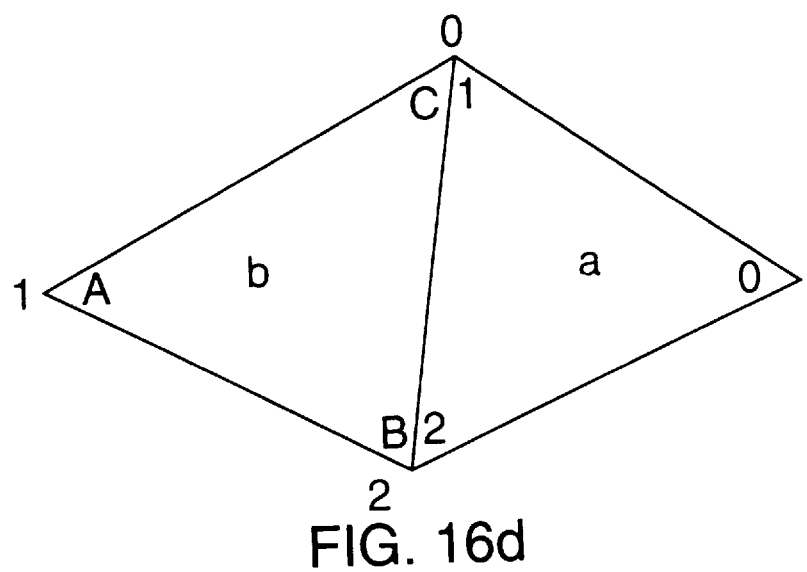

In step 536 of FIG. 17, the CPU 202 performs an adjustment to the record for Triangle "b". The CPU 202 maintains the counterclockwise ordering of the triangles, vertices and neighbors, but realigns the vertices so that the point bounded by the circumcircle, e.g., point 516, FIG. 16b will be in the Vertex 0 slot and Triangle "a" will be in the Neighbor 0 data slot of Triangle "b". FIG. 16c depicts the desired alignment between the Triangles "a" and "b". However, it is possible at the outset that the alignment between the triangles may have a different vertex ordering, such as one of those shown in FIGS. 16d and 16e.

Figure 16E:
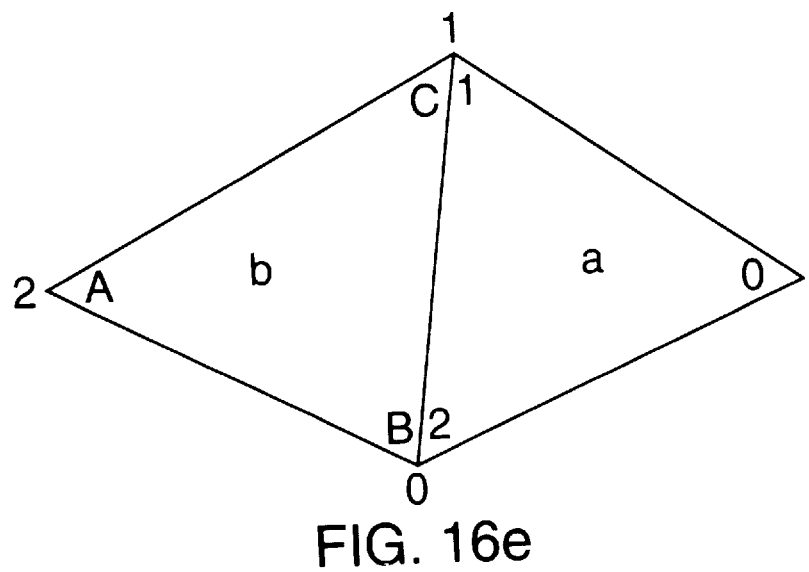

To reorient the vertices and neighbors, the processor first searches Triangle "b"'s neighbor list for the position of Triangle "a". For example, in FIG. 16d Triangle "a" would be in the Neighbor 1 slot opposite Vertex 1. In FIG. 16e, Triangle "a" would be in the Neighbor 2 slot opposite Vertex 2. The position of Triangle "a" in Triangle "b"'s neighbor list is represented by a variable, k such that Triangle "b" (Neighbor #k) =Triangle "a". Having located the k position, the processor in an exemplary embodiment reorients the face data structure for Triangle "b" as follows for the vertices. First, the processor sets the Vertex k slot to the data point reference found in the Vertex (3–k) slot of triangle b. Second, the processor sets the Vertex (3–k) slot to the data point reference found in the Vertex 0 slot of triangle b. Third, the processor sets the vertex #0 slot to the initial data point reference found in the Vertex k slot.

The neighbor references must also now be realigned to match the vertices as follows. First, the CPU 202 sets the Neighbor 3k slot of Triangle "b" (originally a reference to Triangle "a") to the triangle face reference found in the neighbor (3–k) slot. the processor next sets the Neighbor (3–k) slot to the face reference contained in the Neighbor 0 slot of Triangle "b". Third, the processor sets the Neighbor 0 slot to a reference to Triangle "a" with the vertices and neighbors of Triangle "b". Readjusted, the two triangles will have the vertex alignment as shown in FIG. 16c.

Referring again to the flip function of FIG. 17, the CPU 202, after the realignment process of step 536, proceeds to execute the flip in steps 538 and 540. In step 538, the CPU 220 reorganizes the vertices of (newly aligned) Triangle "b" as follows:

Vertex 0=Triangle "a"'s Vertex 0 (i.e., the newly added point)
Vertex 1=Triangle "b"'s Vertex 0
Vertex 2=Triangle "b"'s Vertex 1

In addition, the processor reorders the neighbor for Triangle "b" in step 538 as follows:

Neighbor 0="b"'s Neighbor 2
Neighbor 1"a"'s Neighbor 1
Neighbor 2=Triangle "a"

In addition, the CPU 202 in step 540 executes changes to the data structure to triangle "a". The Vertex 2 slot in Triangle "a"'s data structure is set to Triangle "b"'s Vertex 1. The Neighbor 1 link in Triangle "a" is replaced with a new link to Triangle "b". Also, "a"'s Neighbor 0 slot is now set to point to "b"'s former Neighbor 1.

With these changes the flip is complete and the former Triangle "a" and "b" 514, 515 in FIG. 16b are now redefined as triangles "a" and "b", 520 and 522. With the flip completed the function returns a yes flag in step 542.

With the flip function 464 described above the add function 22 checks all mesh faces for optimal construction in point insertion. When a new point is added the new triangle configuration may need to be reorganized by flipping to maintain Delaunay optimality. In addition, the newly flipped triangles may require additional flipping to keep a state of optimality in relation to other neighbors.

In the exemplary embodiment, the checking procedure of the add function (step 714, FIG. 14) works in a counterclockwise direction from an initial, "home face" triangle (such as NEW TRIANGLE in the insertion example above). Referring to FIG. 14, the checking procedure of step 714 begins at the home face then moves in a counterclockwise direction around the point of insertion, checking triangles until it again reaches the home face. U.S. patent application Ser. No. 08/730,980 and pending U.S. patent application Ser. No. 08/730,979 both describe a system and method for a counterclockwise checking procedure using the flip procedure which is expressly incorporated herein by reference and is suitable for the checking process of the present invention.

It is noted that the checking procedure in one of those applications describes a history list used for "dynamic resolution" meshing. In the present invention the scenes are continually updated by new data, thus the history list is not necessary for the present invention. It is also noted that for purposes of checking triangles, the counterclockwise order of the vertices of the triangle in the manner shown in FIG. 15 has particular advantages in an optimality check, because it guarantees that the new vertex is always V0 for each face. Also, since each vertex corresponds to an opposite edge and neighbor, the ordering creates a way to check the configuration for optimality in a regularized way. First, the neighbor that will be checked for optimality will always be the side involving neighbor 0. Furthermore, the indexing system guarantees that, by repeatedly moving toward "Neighbor 1" of each face, the system will circle around all the faces containing the new point and will eventually get back to the original face. Thus, the indexing creates a way to make a complete optimality check.

As the checking procedure 714 moves in a circular (counterclockwise) direction about the mesh faces, it will call the flip function and flip edges as necessary according to the principle of the Delaunayian circumcircle. If the flip function returns "YES", the checking procedure of step 714 must take steps so that the distance values for those triangles will be recalculated. As part of the checking procedure of step 714, the CPU 202 also places a reference to any flipped triangle on top of the triangle stack.

After the checking procedure of step 714 the CPU 202 proceeds in step 717 of FIG. 14 to prepare an ADD command for transmitting to the receiving computer 12. It is an aspect of this invention that the sending computer 10 compresses each ADD command by encoding before transmitting it to the receiving computer 12. Without command compression, the ADD command could require many bytes of information per command such as this six byte example:

| "ADD" x, y" | + | "R, G, B" |
|---|---|---|
| (3 bytes) | | (3 bytes) |

It is an aspect of this invention that the color component of an ADD command can be encoded to take up less space than the 24 bits (or 3 bytes) that an RGB color assignment might contain. As stated above, the add function 22 uses a color encoding process 366 (FIG. 7) to reduce the data needed to convey information concerning the colors of the point to insert.

The color encoding process 366 works to build and maintain the color tree 368 using color assignments from the points added to the mesh. When a color setting appears on the tree (from a previously added point) the color encoder sends a code showing the location of the color code in the color tree instead of the actual RGB color assignment. The color tree location code requires far fewer bits than an RGB color assignment and hence creates substantial savings. To alert the receiving computer 12, color encoding process will set a flag to indicate to the receiving computer 12 that the command contains encoded information and it must use color tree data to locate the 24 bit RGB value. (As many colors repeat in points added during the compression process, many colors can be encoded using this tree.) Many different types of currently available encoding techniques could be used for such a process.

A command might be as follows:

| ADD Indicator | [x value] | [y value] | Red color code indicator |
|---|---|---|---|
| 1 | | | 111110 |

Returning to FIG. 14, the CPU 202 in step 717 writes this encoded command into the command buffer 307 (FIG. 7). The communications function 18 will read the command buffer and transmit the commands to the receiving computer 12.

In step 718 the CPU 202 returns to step 702 to process the next triangle in the triangle Stack 706. The CPU 202 continues processing to add new points (pulling the next triangle from the top of the triangle stack) until the add function receives a signal to terminate. Following this process hundreds of points can be added to a mesh within the 1/60 th of a second time period that exists between video field updates. For each point inserted, the add function 22 also creates an encoded ADD command for transmission to the receiving computer 12.

The Remove Function

Figure 18:
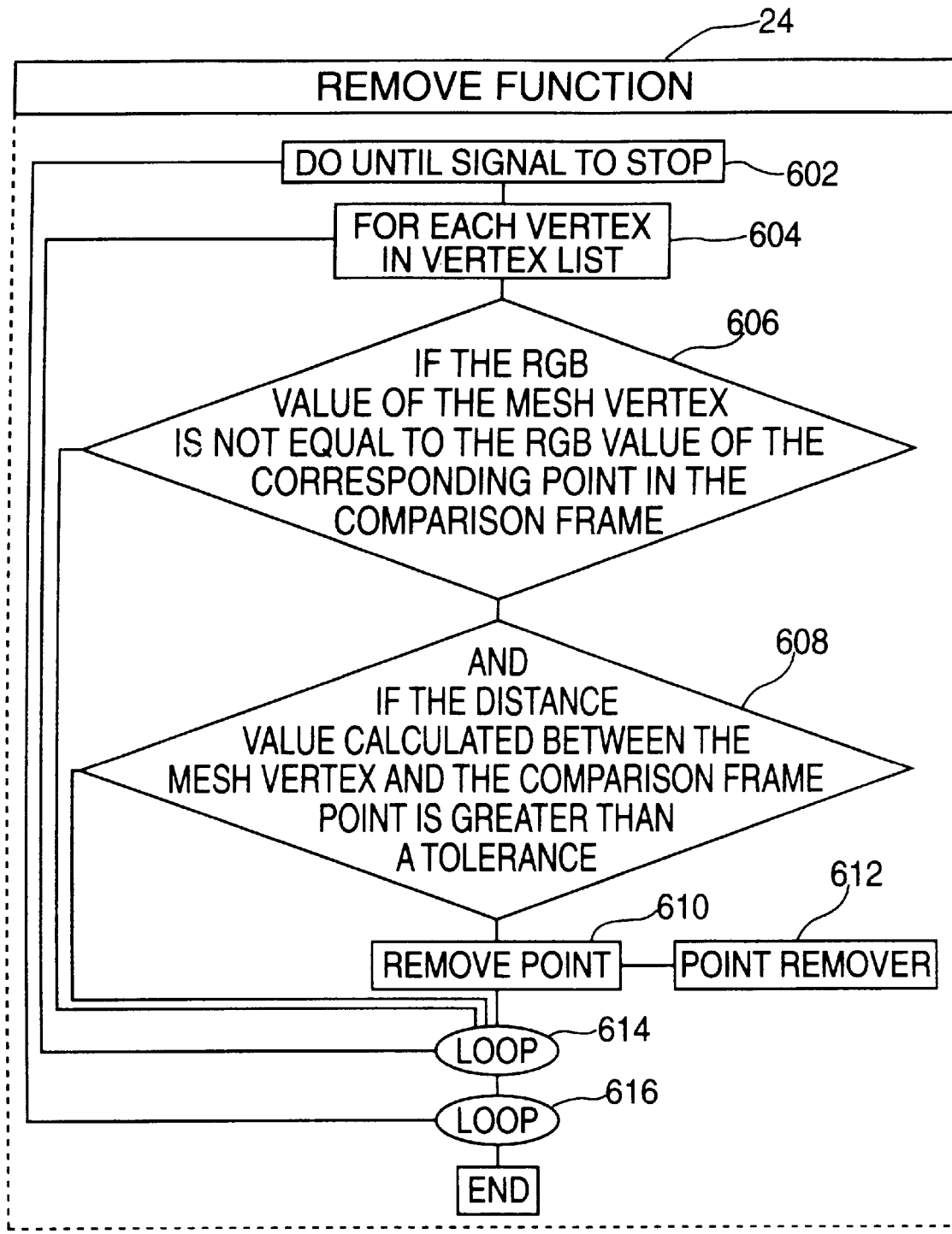
FIG. 18 Depicts an exemplary process flow for the remove function of the present invention.

In a serial process working in conjunction with the add function 22, the remove function 24 (see FIGS. 2 and 7) operates to update the mesh model 20 by removing vertices whose colors no longer match those of the points in the comparison frame 304. FIG. 18 depicts a process flow for an exemplary remove function 24. In step 602 the remove function 24 begins to process until it receives a signal to stop processing. In a second loop (step 604) the CPU 202 begins to process each vertex in the vertex list 310. In the exemplary embodiment, the CPU 202 accesses the vertex list 310. In step 606, the CPU 202 next compares the RGB color data for the vertex against the color data of the corresponding point in the comparison frame 304. If the color values do not match, the CPU 202 proceeds in step 608 to compute a distance value using the two RGB values and following the calculation described above. If the computed distance value is greater than a preset, user defined tolerance, then the remove function 24 will remove that point from the mesh model 20 and make changes related to that removal. To remove the point, the CPU 202 in step 610 calls a point remover function 612. In step 614 the CPU 202 loops back to step 604 and continues to process the next vertex in the vertex list 310. The process of removal continues until the remove function 24 stops processing. In the exemplary embodiment, the present invention executes the processing steps needed to delete a point with the remover (called in step 610).

The point removal process follows the Delaunayian principles so that the system maintains an optimal mesh structure. During the process the remover 612 will alter the structure of the mesh, making triangle edges "flip out" to move the point to be deleted into a configuration from which it can be removed easily and quickly. The process realigns the edges of triangles connected to that point until the point in question is connected to the mesh in the same configuration that existed when the point was initially inserted into the mesh. Referring to FIG. 15, it can be seen that in an exemplary embodiment a new point is always inserted into the bounds of an existing triangle. The new point is connected to the previously existing vertices by three edges. During the checking process of the add function 22, the new configuration is checked for optimality and the flipping procedure used during that optimality check can create additional edge links to that point (as shown in FIG. 9a). The remove function seeks to "reverse" these flips or "flip them out" to pull the point within the bounds of a larger triangle structure (e.g. triangle ABC as shown in FIG. 15) and remove the point by uncoupling its three edge links.

Figure 19:
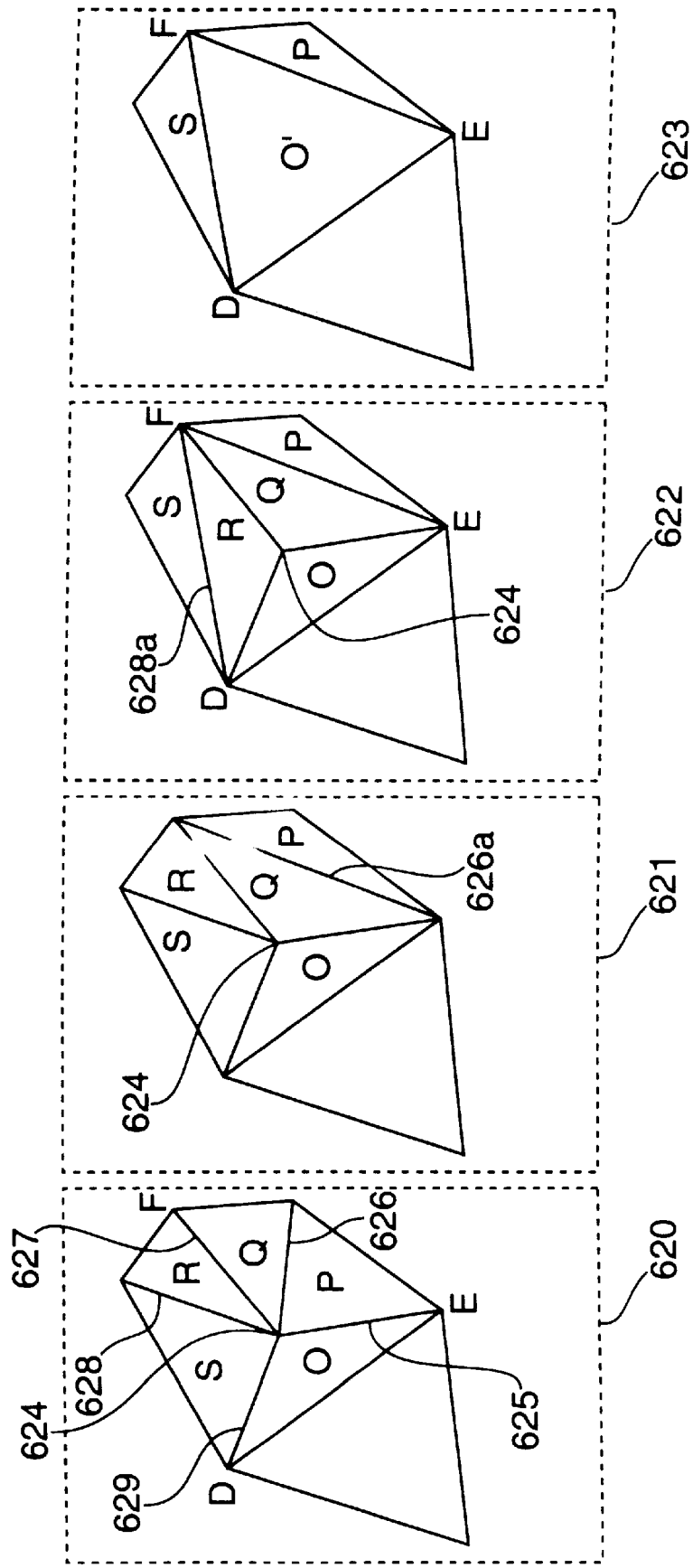
FIG. 19 Depicts an exemplary sequence of transformations the present invention effects when it is readying the mesh for the removal of a point.

FIG. 19 depicts a sample mesh configuration and shows the changes that occur as the remover 612 works to delete a point (point 624) from the mesh. At the time the remover (612) receives the command to remove the point, in frame 620 point 624 is connected to five triangles: O, P, Q, R and S (with edges 625, 626, 627, 628 and 629). To place point 624 back into a configuration for removal, the remover 612 must "flip out" two of these triangle links so that the edges between those triangles are no longer connected to point 624. In the next instant (shown in FIG. 19 at 621) the remover 612 has flipped edge 626. The new edge 626a is not connected to point 624. In the next instant (shown in FIG. 19 at 622) the remover 612 has flipped edge 628. Like edge 626a, new edge 628a is also no longer connected to point 624. In the next instant (shown in FIG. 19 at 622) it can now be seen that point 624 (while still being connected to the mesh) and used in triangles (O, Q, and R) is also bounded by a larger triangle: DEF. This new configuration matches an initial configuration for the point when it was inserted. When the mesh is in this configuration, the point remover function 612 disconnects the point from the mesh structure. In the next instant (shown in FIG. 19 at 623), the process has deleted the point and only a single triangle O' remains. During the process, the point remover function 612 preserves the Delaunayian quality of the mesh, such that when the point has been removed, the remaining triangle will continue to meet the Delaunayian criteria for optimality.

Figure 20:
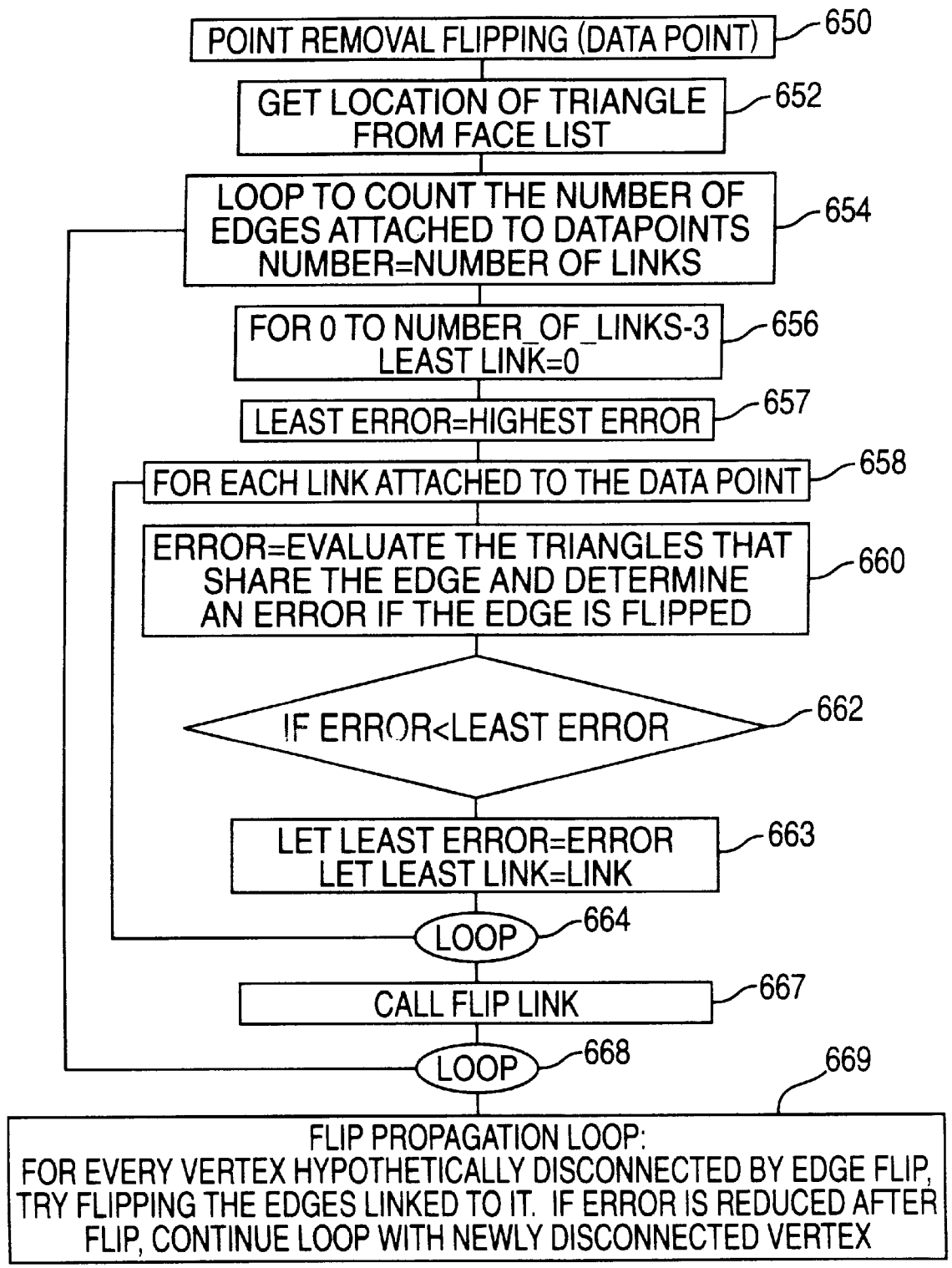
FIG. 20 Depicts an exemplary process flow of the point remover function of the present invention.

FIG. 20 depicts an exemplary process flow for a point removal flipping procedure which minimizes the structure deviations. In step 650, the processor receives as arguments the index reference for the data point to be removed. In step 652, the processor proceeds to a face ID (a reference to a face record in the mesh data structure) to one of the faces which uses the data point as a vertex. From that face reference it is possible to count all of the triangles (and their edges) which share the data point and use it as one of the vertices. In step 654, the processor executes a procedure to count the faces (or edges) sharing the point. The process in step 654 uses the rigid ordering of the face records to traverse the faces which share the data point. Because the vertices of each face are numbered in a rigid order (such as the counter-clockwise order) it is possible to move in a circular direction around the data point and count the connected faces. In the exemplary embodiment, the present invention uses a rigid counter-clockwise ordering system and the neighbor triangle associated with the first counter-clockwise vertex from the data point in any triangle always yields the next counter-clockwise face to check. In step 654, the processor loops in a counter-clockwise direction using the references to vertices and neighbors in the mesh data structure until it counts up all of the links to the data point.

Figure 21:
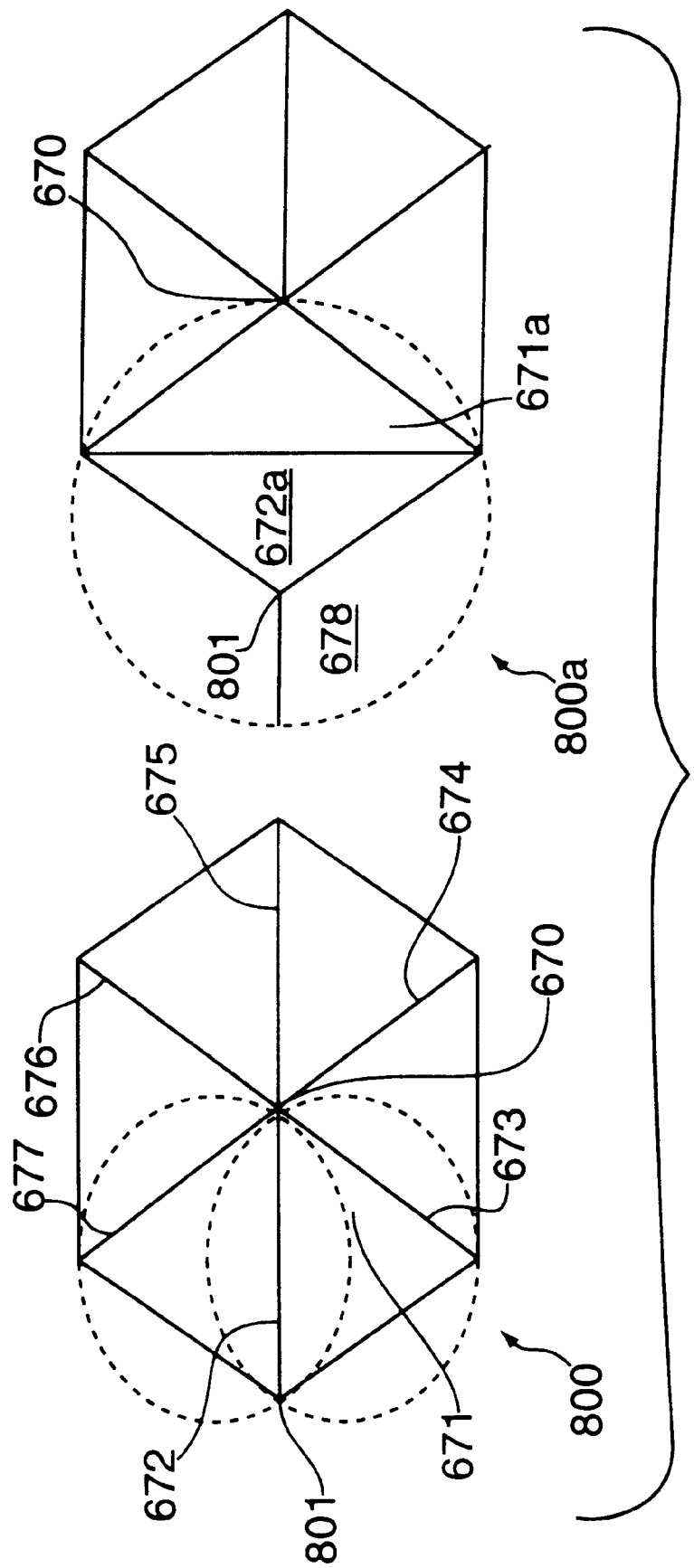
FIG. 21 Depicts an exemplary error evaluation which accesses Delaunayian error in a reverse flip.

When there are more than three links, the processor must make flips to transform the . mesh and bring it into a configuration that allows for point removal. If there are 5 edge links to the data points in the mesh for example, the loop of step 654 will make 2 flips to bring the number of links to 3. In step 656, the processor begins a loop to determine the one flip that has the least amount of error in terms of moving the mesh away from an optimal structure. In step 658, the processor begins a second loop to examine each link and determine the "error" that would be incurred. The processor flipped that link. The system, of the present invention permits many different types of error evaluation techniques, including Delaunayian. Delaunayian checking insures regularity in the mesh triangles by following the rule that for any triangle in the mesh, there is no other mesh point that will fall within a circumcircle defined by the triangle's points. FIG. 21 depicts a data point 670 to be removed from a mesh configuration 800. There are 6 edges (edges 672–677) connected to point 670; three must be flipped to remove the point. For each edge the process determines, using a Delaunayian error evaluation algorithm, how far an edge flip will take the configuration away from Delaunayian optimality. In FIG. 21, mesh configuration 800 begins the comparison at edge 672. The two triangles (triangles 671 and its neighbor) which share edge 672 are Delaunayian in this configuration as their circumcircles include no other points. However, flipping edge 672 to edge 672a creates a configuration that is not optimal by Delaunayian principles. As shown in mesh configuration 800a, the revised triangles 671a and its neighbor are not Delaunayian. The circumcircle for revised triangle 671 a now includes point 801 from its neighbor. The distance into which the point 801 falls into the circumcircle is indicated by the distance value d (678). The distance value d represents the error value for the edge in the Delaunayian checking procedure. During the checking procedure, the system will compute a d value for each edge (e.g., edges 672–677). The processor will then flip the edge with the smallest value. That flip will add the smallest amount of error to the system.

Referring again to FIG. 20, the processor uses the error calculation functions described above to determine an error value for each edge examined in step 660. As each edge is evaluated, if the error value calculated for the error is the lowest, the processor will allow the edge to be the edge with the least error (see step 662). The process loops in step 664 to step 658 until the computer processes all the edges connected to the data point.

Moving out of that loop in step 667, the processor executes a flip for the link with the lowest error. The flip function executes a set of changes in the data structure replacing an edge shared by two triangles with an edge connecting the unshared vertices of the two triangles. An exemplary flip function which is suitable for the flip function of the present invention was described above and in U.S. patent application Ser. Nos. 08/730,980 and 08/730,979 which are expressly incorporated herein by reference.

In step 668, the processor loops to step 654 to continue flipping links until the mesh can be transformed into a state which will all other data point removal. The processor may make one, two or more flips until only three edges remain connected to the data point in question.

However, after that flipping procedure, there still may be some clean-up work to do. After flipping to transform the mesh for point removal, the processor moves to step 669 to execute a second loop which will determine if the flips just taken will require any further adjustments to the mesh. As noted, a flip to remove a point may take the mesh out of an optimal state. In making flips to remove a point from the mesh, it will also be necessary to check the triangles in the area around the flips to determine if the mesh needs adjustment to maintain its optimal construction. When an edge is flipped in the process described above, the flip will disconnect one data point from its edge relationship with the point to be removed. For each disconnected point, the processor will execute a flip propagation loop after the flip, moving each disconnected point to this point to perform the evaluation of error similar to steps 656–667 above. For each edge that is connected to the disconnected point, the procedure first performs the error calculation either by Delaunayian or normals and then executes a hypothetical flip for that edge and computes the error value. If the error is less after the flip, the processor will leave the edge flipped (or actually flip the edge) and then go on to repeat the procedure for the newly disconnected point. The procedure at step 669 continues this way until each newly disconnected edge has been flipped.

Referring again to FIG. 18, the point remover 612 removes the point. To execute the removal, the CPU 202 removes the deleted point from the vertex list 310. To do this, the CPU 202 places the vertex ID# for the point onto the vertex ID free list 328 (referenced above in FIG. 7). This reference provides a way for the ADD function to know that the vertex in question has been removed and that its ID can be reused in subsequent point additions.

When a point is removed, the CPU 202 will also free the two triangle records which were deleted in the mesh configuration described above. To remove the records, the CPU 202 simply places the ID numbers of these triangles onto the triangle ID free list 318 (also referenced above in FIG. 7).

The CPU 202 completes the point removal process by sending a REMOVE command to the command buffer 307 (FIG. 7) which will in turn be communicated to the receiving computer 12. With the present invention, a REMOVE command is easily compressed by transmitting a shorthand command such as "REMOVE VERTEX ID #__." With the command sent, the remover 612 (FIG. 18) completes its process. The CPU 202 loops in step 614 the remove function 24 proceeds to step 604 and processes another datapoint in the vertex list. The processing continues until all the vertices have been processed.

Receiving Computer Functions

Figure 22:
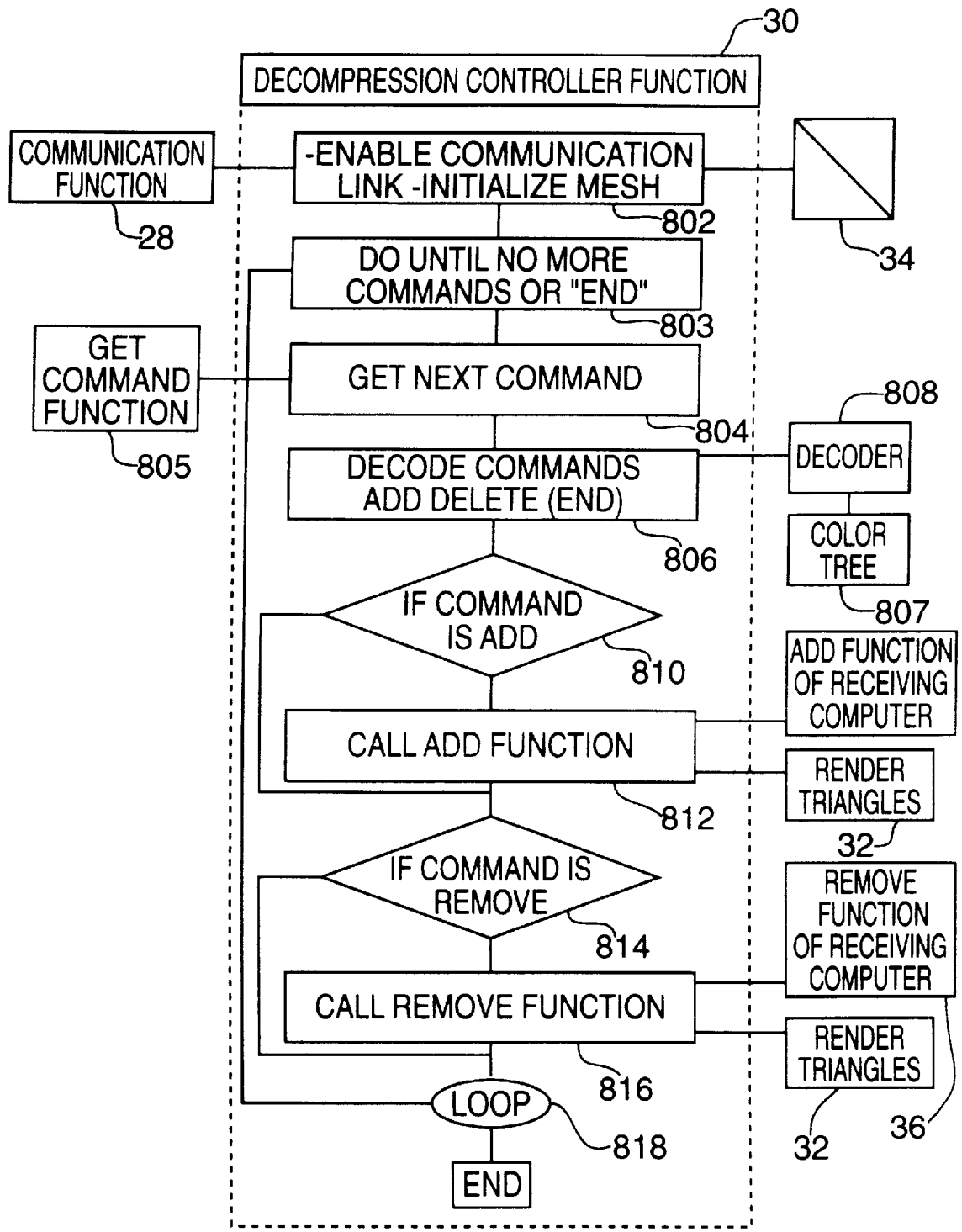
FIG. 22 Depicts an exemplary process flow for the decompression function of the present invention.

The receiving computer 12 functions to process incoming commands transmitted by the sending computer 10. As stated above, (in reference to FIG. 2) for such command processing, the receiving computer 12 executes the basic communication, decompression and display rendering functions (28, 30 and 32) (as depicted in FIG. 2). The decompression function 30 controls the process. FIG. 22 depicts an overview of the process flow used in an exemplary decompression function 30.

In FIG. 22 step 802 initiates the decompression controller functions of: (i) enabling the communication function 28 to establish the link between sending and receiving computers; and (ii) establishing certain data structures used in decompression. In particular, the decompression controller function 802 initializes the mesh model 34 (referenced previously in FIG. 2). The mesh model 34 is configured exactly as the mesh model 20 of the compression function 16 (e.g., initially with the two triangle Steiner point construction described in FIG. 3) and is prepared to accept the addition and deletion of points so that its construction mimics that of the mesh model 20 of the compression function 16.

After initialized, the decompression function 30 executes the commands it receives, altering its mesh model 34 as instructed and outputting to the display images based on the triangulated mesh. In step 803, the CPU 230 enters a loop in which it will process commands until it receives an "end" command or other signal to stop. In step 804, the CPU 230 obtains the next command. A get command function 805 operates to read the commands as they are received by the computer system and retrieve the next command from the sequence, either an ADD or REMOVE. In step 806, the CPU 230 decodes that command using a process which recognizes the sequence of signals for each ADD and REMOVE command. For each ADD command, the decompression function will also build, on-the-fly, a color tree 807 just as the ADD function 22 builds a color tree of each new color as it transmits. A decoding function 808 of the receiving computer uses the same process as the color encoder function (366, FIG. 7) on the sending computer 10. The compression function 16 of the sending computer 10 builds a color tree through successive add commands; the decompressor builds the same tree through successive decoding operations.

After decoding a command, the CPU 230 processes it. If in step 810, the command is to ADD, the CPU 230 proceeds to step 812 to execute the steps of the add function 36 (referenced above in FIG. 2). The add function 36 of the receiving computer operates to update the mesh model 34 just as the add function 22 of the sending computer updated the mesh model 20. And, just like the add function 22 previously described, the add function 36 inserts data points into the mesh model 34 of the receiving computer 12, making changes as necessary to maintain Delaunayian optimality. As the mesh model 34 of the receiving computer 12 mirrors the mesh model 20 of the sending computer 10, the add functions are identical in terms of adding the data point to the mesh and generating related changes. When the add function adds a new data point it will also send to the render function 32 a sequence of commands to draw the newly created triangles and redraw existing triangles affected by the insertion.

If, in step 814, the CPU 230 determines that the current command is to REMOVE a point, the processor proceeds to step 816 to execute the remove function 38 (referenced above in FIG. 2). The remove function 38 of the receiving computer 12 operates just as the remove function 24 of the sending computer IO. The system executes the exact same process to remove a point as the remove procedure 24 of the sending computer and redraws all triangles affected by the removal of a point. After executing an add or remove function, the CPU 230 loops in step 818 and proceeds back to step 803 to determine if there are more commands to process. If there are no more commands, the CPU 230 proceeds again to step 804 and gets the next command.

Figure 23:
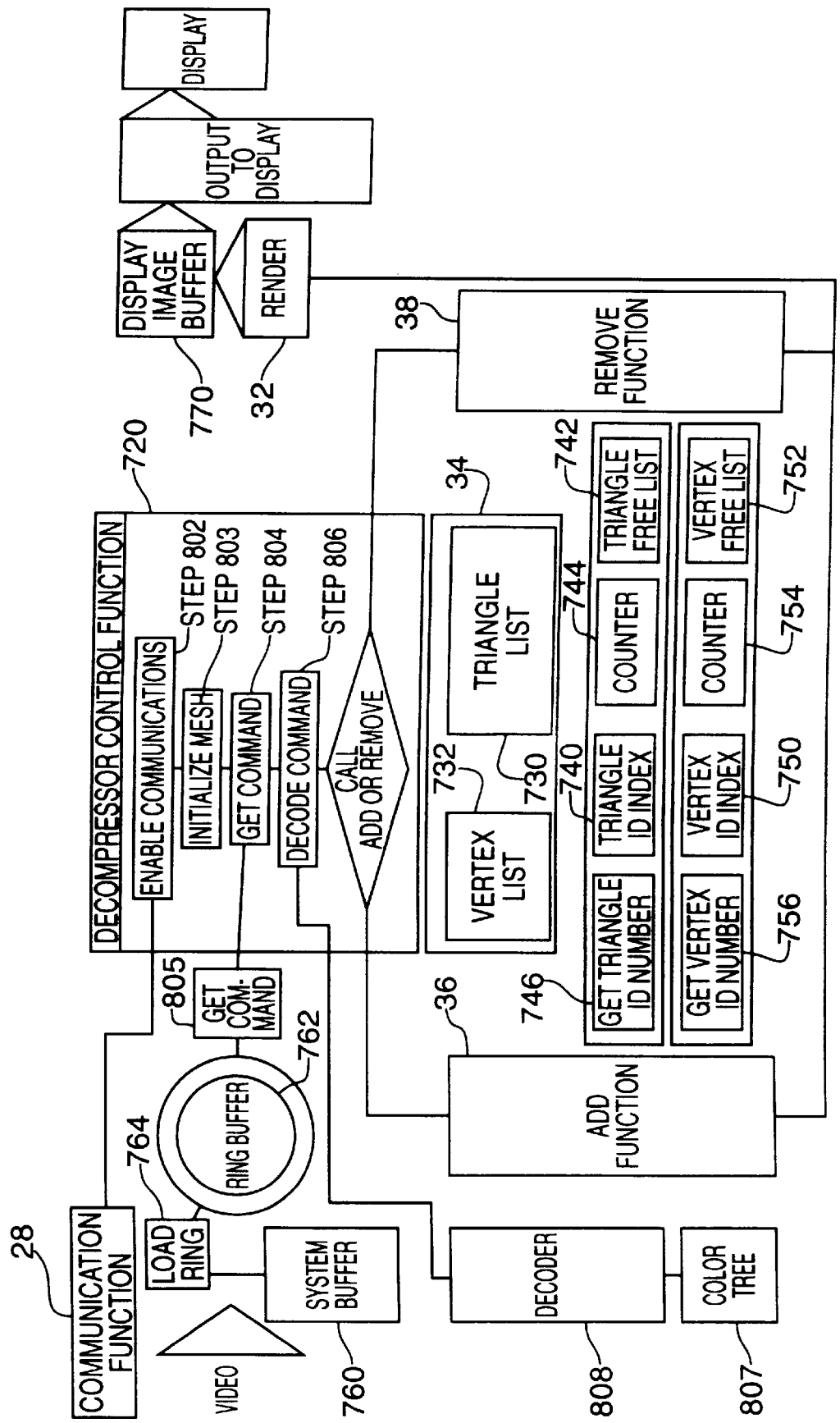
FIG. 23 Depicts an exemplary overview of processes and data structures used to implement the decompression function of the present invention.

In addition to the similarities in their basic process flows, it is also noted that the decompression function 30 of the receiving computer 12 are much the same in terms of their program components and data structures. FIG. 23 sets forth an exemplary depiction of program elements and data structure used by the decompression function 30 of the present invention. Like the compression function 22 of the sending computer 10, the decompression function 30 maintains the mesh model 34 of the triangulation using a triangle list 730 and a vertex list 732, which are identical to their counterparts in the sending computer 10 (see FIG. 7). In addition, the decompression function 30 also maintains index lists to the triangles and vertices which are also identical to their sending computer counterparts. The triangle ID index 740 references each triangle in the triangle list 730 with a unique ID number. The decompression function 30 also maintains a triangle free list 742 and a counter 744 to generate numbers. A get triangle ID module 746 will generate a sequence of ID numbers which will match a sequence of numbers generated by the triangle ID system used by the compression function 16 on the sending computer. For vertices, the decompression system 30 also provides an ID number system with a vertex ID index 750, a vertex free list 752, a counter 754 and a get vertex ID number function 756. Those vertex ID structures operate just as the vertex ID system of the compression function 16.

A decompression controller function 720 executes the basic decompression functions as described above (in FIG. 22), of the system initialization (803), getting commands (804), decoding commands (806) and executing commands through the add and remove functions (36 and 38).

Commands come to the receiving computer 12 in groups, such as in packets of size that is supported by the communication system 26. (FIG. 2). The operating system of the receiving computer places the command bundles in a system buffer 760. A get command function 805 executes when called to move command data from the system buffer 760 and feed individual commands to the decompression function 30. When the decompression controller function 720 calls the get command function 805, the CPU 230 first reads all the incoming commands from the system buffer 760 and loads them into a ring buffer 762. A load ring function 764 can distinguish between the beginning and the end of a command and write each command to an individual slot in the ring buffer 762. The get command function invokes the load ring function 764 to load the ring buffer, reads the ring buffer in FIFO (first-in-first-out) order and delivers each command—ADD, REMOVE (or END) to the controller 720 which passes it to the decoding function 808. If the command is to ADD the decoding function 808 either builds the color tree 807 to add a new color value or uses the existing values of the color tree to decode a color code. After decoding, the decompression controller function 720 will pass the commands to the add or remove function (36 or 38).

As each of the add and remove functions operate, they will output triangle drawing instructions to the rendering function 32. The rendering function 32 generates pixel color assignments for each triangle using, for example, Gouraud shading techniques. The rendering function writes these assignments to a image display buffer 770. The image display buffer 770 on the Receiving Computer 12 is comprised of a stack of 24 bit planes, each having dimensions to match the picture size of the image e.g. 640×480. The render function will also output pixel information from this buffer 770 to the display to create and update the motion picture images by drawing and redrawing colored triangles.

Other Configurations

Figure 24:
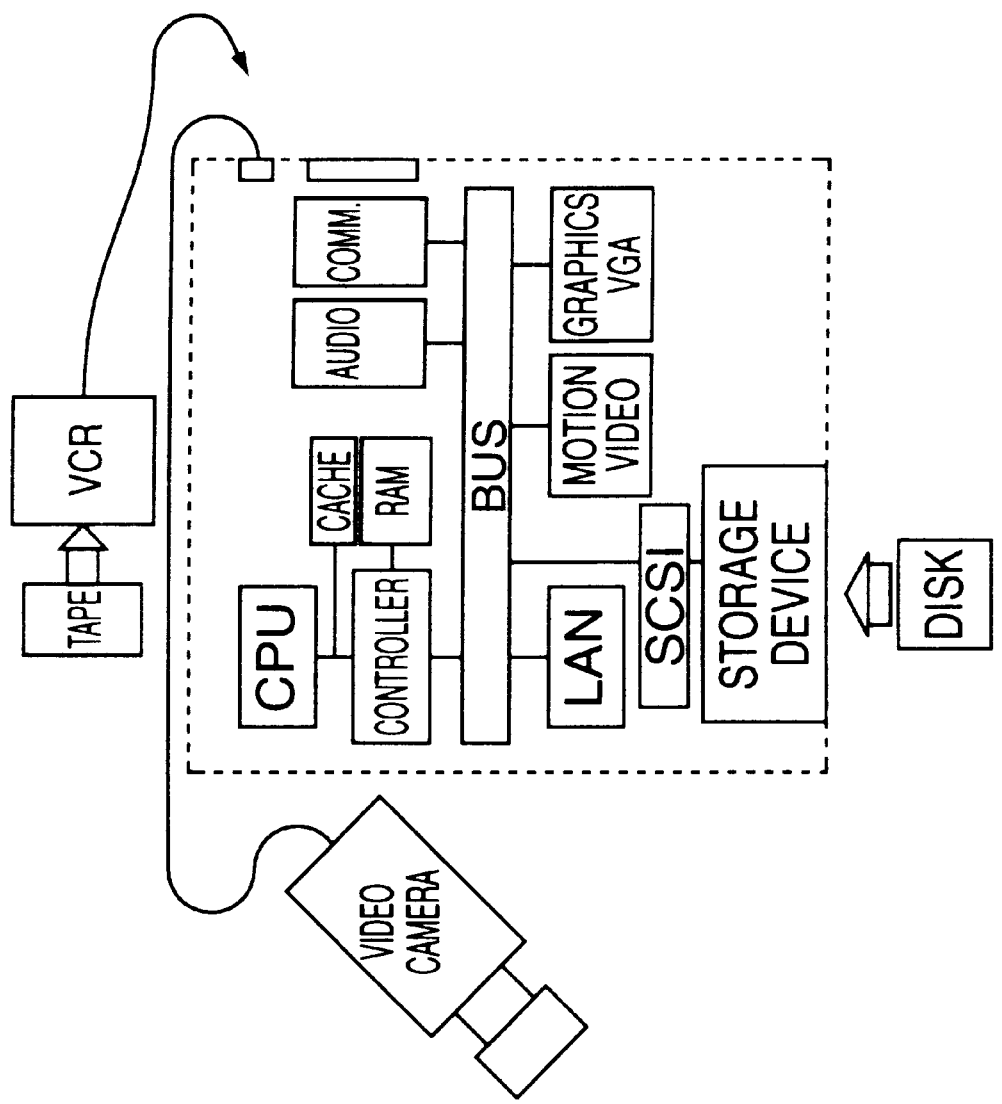
FIG. 24 Depicts the compression system of the present invention configured to store the compressed digitized video at both sending and receiving computer locations.
Figure 25:
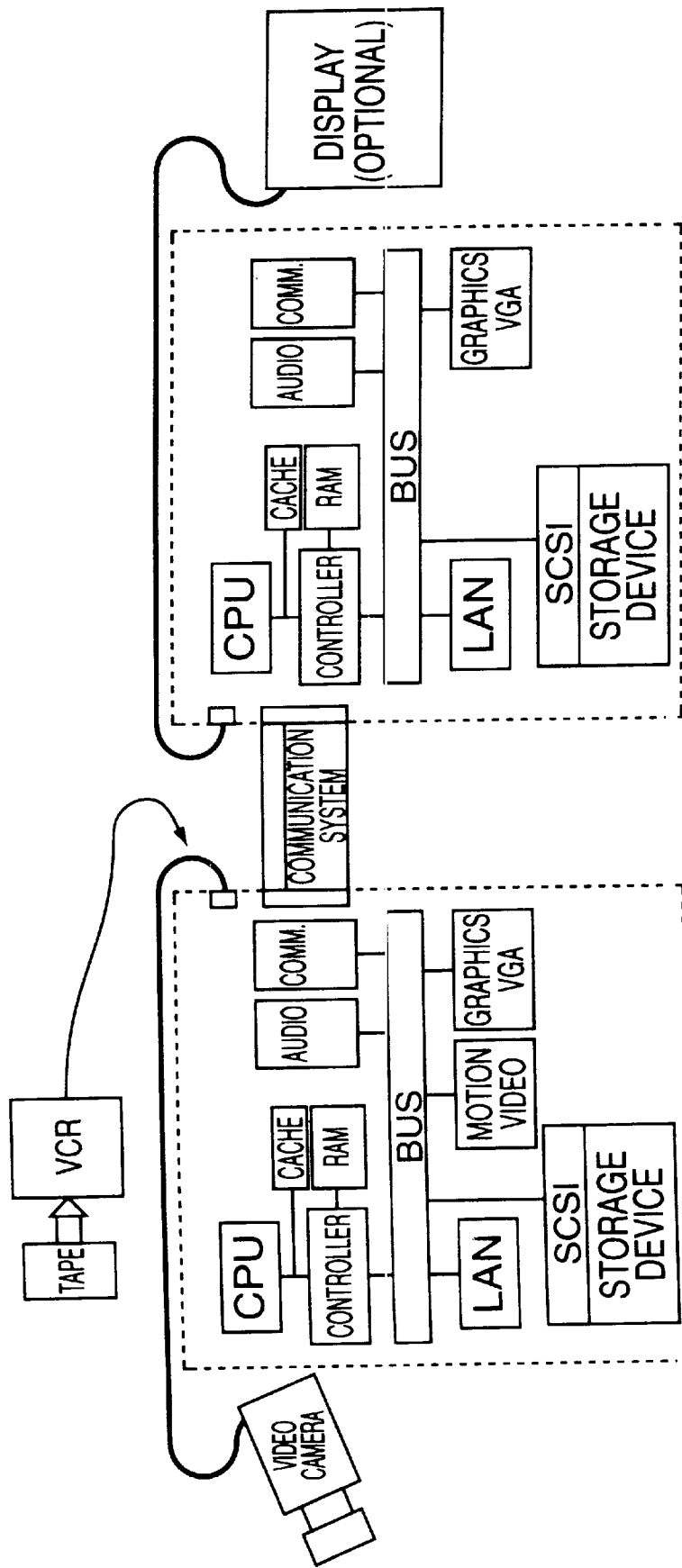
FIG. 25 Depicts the compression system. Configured for transmitting a video transmission to a remote terminal.

In addition to its use for video conferencing and other Real time transmissions, the present invention can be used for compact storage. FIG. 24 depicts a configuration for compressing digitized video according to the present invention and storing the sequence of ADD and REMOVE commands on storage media such as magnetic disks, magnetic tape and optical storage devices. In FIG. 24, the computer depicted is configured like the sending computer 10, however, all the commands which were previously output to the receiving computer in the configuration above are, in FIG. 24, output to a storage device. The video input can be either a live video feed or pre-recorded video (output on a device such as a VCR). FIG. 25 depicts a configuration wherein the compressed digitized video is stored at both sending and receiving computers. During the transmission, each computer of this configuration outputs the sequence of ADD and REMOVE commands to a storage device rather than outputting those command sequences to a display.

For playback after storage, a computer reading the stored material shall be configured for decompression like the receiving computer 12. A decompression function would read the commands from the storage device and process the commands as input.

The invention continues as described above. The above described embodiment of the invention is meant to be representative only, as certain changes may be made therein without departing from the clear teachings of the invention. Accordingly, reference should be made to the following claims which alone define the invention.

We claim:

1. A computer-based system for the transmission of moving picture images from a sending terminal to a receiving terminal, the sending terminal including a processor coupled to a memory and program elements adapted to accept as input a two-dimensional moving picture image or containing a moving picture image in memory, the receiving terminal including a processor coupled to a memory and program elements and both terminals containing a transmission/receiving device, the system comprising:

（a) a sending terminal modeling element for generating a model of the image, the image including a plurality of picture elements, the model including selected ones of the plurality of picture elements, the selected ones of the plurality of picture elements being linked through connections;

(b) a sending terminal transmission element to send the plurality of picture elements of the model to the receiving terminal;

(c) a receiving element to receive the picture elements of the model at the receiving terminal;

(d) the sending terminal modeling element further adapted to continuously alter the model based on changes to the moving picture image;

(e) the sending terminal transmission element further adapted to send any changes to the model to the receiving terminal; and (f) the receiving terminal element further adapted to receive the changes in the model transmitted by the sending terminal.

2. The system of claim 1 where the receiving terminal further comprises a render element to recreate the model using the picture elements transmitted by the sending terminal and further adapted to continuously update the model as changes are received at the receiving terminal.

3. The system of claim 2 where the receiving terminal further comprises an output device to display the model created by the rendering element.

4. The system of claim 1 where either terminal can be configured to operate as the sending terminal, receiving terminal or both the sending and receiving terminal.

5. A computer-based system for the transmission of moving picture images from a sending terminal to a receiving terminal, the sending terminal including a processor coupled to a memory and program elements adapted to accept as input a two-dimensional moving picture image or containing a moving picture image in memory, the receiving terminal including a processor coupled to a memory and program elements and both terminals containing a transmission/receiving device, the system comprising:

(a) a sending terminal modeling element for generating a model of the image, the model containing a plurality of picture elements, where a picture element is a discrete portion of the entire image such that the plurality of picture elements in the model can approximate the entire image, but is smaller than the number of pixels in the entire image;

(b) a sending terminal adder element to add the picture elements of the model as a series of add commands to a sending terminal command list;

(c) a sending terminal deletion element to check the picture elements in the current model as the moving picture image is altered to determine if the picture elements are still valid, and further adapted to remove an invalid picture element from the model and send a remove command to the command list, (d) the sending terminal adder element further adapted to operate concurrently with the deletion element to add new picture elements to the model as the moving picture image changes and send an add command to the command list;

(e) a sending terminal transmission element to send the add and remove commands from the sending terminal command list on a first in, first out basis to the receiving terminal; and (f) a receiving terminal fetch element to receive the add and remove commands from the sending terminal and place the commands in a receiving terminal command list such that the sending and receiving terminal command lists are identical.

6. The system of claim 5 where the receiving terminal further comprises a render element to recreate the model at the receiving terminal from the add and remove commands in the command list, and further adapted to refresh the model as new commands are added to the command list.

7. A computer-based system for the transmission of moving picture images from a sending terminal to a receiving terminal, the sending terminal including a processor coupled to a memory and program elements adapted to accept as input a two-dimensional moving picture image or containing a moving picture image in memory, the receiving terminal including a processor coupled to a memory and program elements and both terminals containing a transmission/receiving device, the system comprising:

(a) a sending terminal modeling element for generating a mesh model of the image from a plurality of data points, with each data point containing both spatial and color data describing the moving picture image, the mesh comprising a set of adjacent faces creating a model approximating the image, with each face being a triangle determined by ones of the data points, the ones of the data points for each face comprising the vertices of that face;

(b) a sending terminal face data structure configured to contain the face data records holding references to data points that make up the vertices of a face in the mesh;

(c) a receiving terminal face data structure configured to be identical to the sending terminal face data structure;

(d) a sending terminal deletion element to check the data points in the current model as the moving picture image is altered to determine if the data points are still valid, and further adapted to remove an invalid data point from the model, delete the reference to the data point in all face records containing the removed data point, reorder the face data structure so that face records from which data points have been removed are moved to the top of the data structure and send a remove command to the command list to remove the data point;

(e) a sending terminal adder element working concurrently with the deletion element to determine where a change has occurred in the moving picture image requiring a new data point to be inserted, the adder element will begin checking for image changes in the areas occupied by face records that have been moved to the top of the data structure, the adder function being further adapted to insert the new data point to the model and create an add command to be added to the command list for addition of the new data point;

(f) the sending terminal modeling element further adapted to regenerate the model using the remaining data points and any new data points;

(g) a sending terminal transmission element to send the add and remove commands from the sending terminal command list on a first in, first out basis to the receiving terminal;

(h) a receiving terminal fetch element to receive the add and remove commands from the sending terminal and place the commands in a receiving terminal command list such that the sending and receiving terminal command lists are identical; and (i) a receiving terminal render element to recreate the mesh model from the sending terminal at the receiving terminal using the add and remove commands from the command list, create face records identical to the records contained in the sending terminal face data structure and further adapted to continuously update the model as commands are transmitted by the sending terminal.

8. The system of claim 7 where the deletion element is further adapted to remove data points from the model only if the color value of the changed image is greater than a specified color tolerance level.

9. The system of claim 8 where the color tolerance value is automatically settable by the system based on the usable bandwidth of the transmission system.

10. A computer-based system for the storage of moving picture images, including a processor coupled to a memory and program elements adapted to accept as input a two-dimensional moving picture image or containing a moving picture image in memory, the system comprising:

(a) a modeling element for generating a mesh model of the image from a plurality of data points, with each data point containing both spatial and color data describing the moving picture image, the mesh comprising a set of adjacent faces creating a model approximating the image, with each face being a triangle determined by ones of the data points, the ones of the data points for each face comprising the vertices of that face;

(b) a face data structure configured to contain the face data records holding references to data points that make up the vertices of a face in the mesh;

(c) a deletion element to check the data points in the current model as the moving picture image is altered to determine if the data points are still valid, and further adapted to remove an invalid data point from the model, delete the reference to the data point in all face records containing the removed data point, reorder the face data structure so that face records from which data points have been removed are moved to the top of the data structure and send a remove command to the command list to delete the data point, (d) an adder element working concurrently with the deletion element to determine where a change has occurred in the moving picture image requiring a new data point to be inserted the adder element will begin checking for image changes in the areas occupied by face records that have been moved to the top of the data structure, the adder function being farther adapt ed to insert the new data point to the model and create an add command to be added to the command list for addition of the new data point;

(e) the modeling element further adapted to regenerate the model using the remaining data points and any new data points; and (f) a transmission element to send the add and remove commands from the command list on a first in, first out basis to a storage media.

11. The system of claim 10 where the storage media is video tape.

12. The system of claim 10 where the storage media is a magnetic computer disk.

13. The system of claim 10 where the storage media is an optical computer disk.

14. The system of claim 1, wherein the model includes a mesh model.

* * * * *

UNITED STATES PATENT AND TRADEMARK OFFICE
CERTIFICATE OF CORRECTION

PATENT NO.    : 6,064,771
DATED         : May 16, 2000
INVENTOR(S)   : Migdal et al Page 1 of 1

It is certified that error appears in the above-identified patent and that said Letters Patent is hereby corrected as shown below:

Column 12,
Line 40, change "...a cross..." to -- ...across... -- ;

Column 32,
line 58, delete ".";

Column 35,
Line 34, change "... 10..." to -- ... 10... -- ;

Column 40,
Line 18, change "... inserted the adder..." to -- ... inserted, The adder... -- ;
Line 21, change "... adapt ed..." to -- ... adapted... -- .

Signed and Sealed this

Eleventh Day of September, 2001

Attest:

*Nicholas P. Godici*

NICHOLAS P. GODICI
*Acting Director of the United States Patent and Trademark Office*

*Attesting Officer*

UNITED STATES PATENT AND TRADEMARK OFFICE
CERTIFICATE OF CORRECTION

PATENT NO.   : 6,064,771
DATED        : May 16, 2000
INVENTOR(S)  : Migdal et al.

It is certified that error appears in the above-identified patent and that said Letters Patent is hereby corrected as shown below:

Column 12,
Line 40, change "...a cross" to -- ...across... --;

Column 32,
Line 58, delete ".";

Column 35,
Line 34, change "... lO..." to -- ... 10... --;

Column 40,
Line 18, change "... inserted the adder..." to -- ... inserted the adder... --;
Line 21, change "... adapt ed..." to -- ... adapted... --.

This certificate supersedes Certificate of Correction issued September 18, 2001.

Signed and Sealed this

Twentieth Day of August, 2002

Attest:

JAMES E. ROGAN
Attesting Officer    Director of the United States Patent and Trademark Office